(12) United States Patent
Eguchi

(10) Patent No.: US 8,373,933 B2
(45) Date of Patent: Feb. 12, 2013

(54) OPTICAL SYSTEM AND OPTICAL APPARATUS INCLUDING OPTICAL SYSTEM

(75) Inventor: Kaoru Eguchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 37 days.

(21) Appl. No.: 12/647,099

(22) Filed: Dec. 24, 2009

(65) Prior Publication Data

US 2010/0165476 A1 Jul. 1, 2010

(30) Foreign Application Priority Data

Dec. 26, 2008 (JP) .................. 2008-333870

(51) Int. Cl.
*G02B 15/14* (2006.01)
*G02B 9/04* (2006.01)
*G02B 13/04* (2006.01)

(52) U.S. Cl. ......... 359/691; 359/753; 359/682; 359/793

(58) Field of Classification Search .......... 359/649–651, 359/682–683, 691, 753, 793; 396/72–88; 348/240.99–240.3
See application file for complete search history.

(56) References Cited

U.S. PATENT DOCUMENTS

| | | | | |
|---|---|---|---|---|
| 7,173,766 B2* | 2/2007 | Kimura et al. | ................ | 359/649 |
| 7,193,789 B2* | 3/2007 | Maetaki | ................ | 359/687 |
| 7,292,398 B1* | 11/2007 | Misaka | ................ | 359/781 |
| 7,426,079 B2 | 9/2008 | Yokoyama | | |
| 7,911,707 B2* | 3/2011 | Okada | ................ | 359/680 |
| 2002/0018301 A1* | 2/2002 | Narimatsu et al. | ................ | 359/683 |

FOREIGN PATENT DOCUMENTS

| | | | |
|---|---|---|---|
| JP | 6-082689 A | 3/1994 | |
| JP | 9-033801 A | 2/1997 | |

OTHER PUBLICATIONS

"OHARA Inc. : Optical Glass DATA." OHARA. Web. Apr. 7, 2011. <http://www.ohara-inc.co.jp/en/product/optical/list/index.html>.*
Chinese Office Action issued in Counterpart Application 200910262249.9 dated Mar. 20, 2012. English Translation provided.

* cited by examiner

*Primary Examiner* — Ricky Mack
*Assistant Examiner* — Zachary Wilkes
(74) *Attorney, Agent, or Firm* — Rossi, Kimms & McDowell LLP

(57) ABSTRACT

Provided are an imaging optical system in which chromatic aberrations are excellently corrected across the entire screen to realize high optical performance, and an optical apparatus including the imaging optical system. In an imaging optical system of which a back focus is longer than a focal length, a lens unit located in a reduction-conjugate side of an aperture stop includes at least one positive lens. A partial dispersion ratio and an Abbe number of the positive lens are set such that a refractive index, a position, and a power satisfy a suitable relationship.

4 Claims, 15 Drawing Sheets

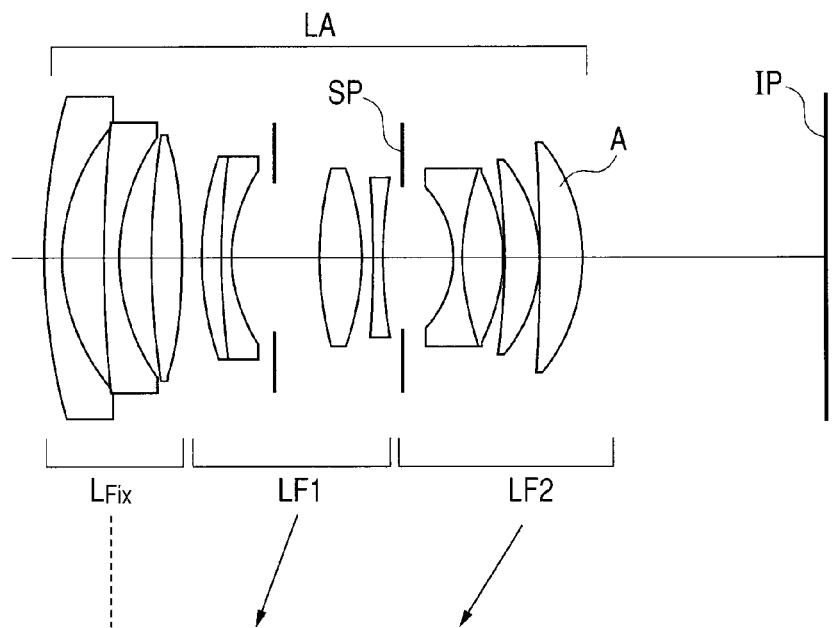
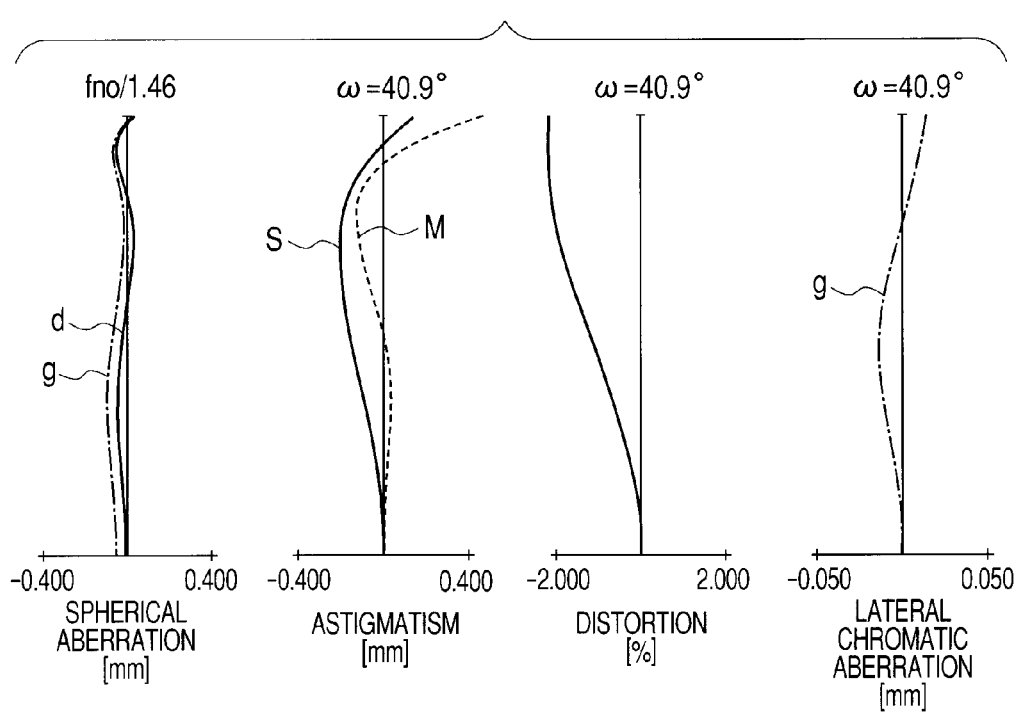

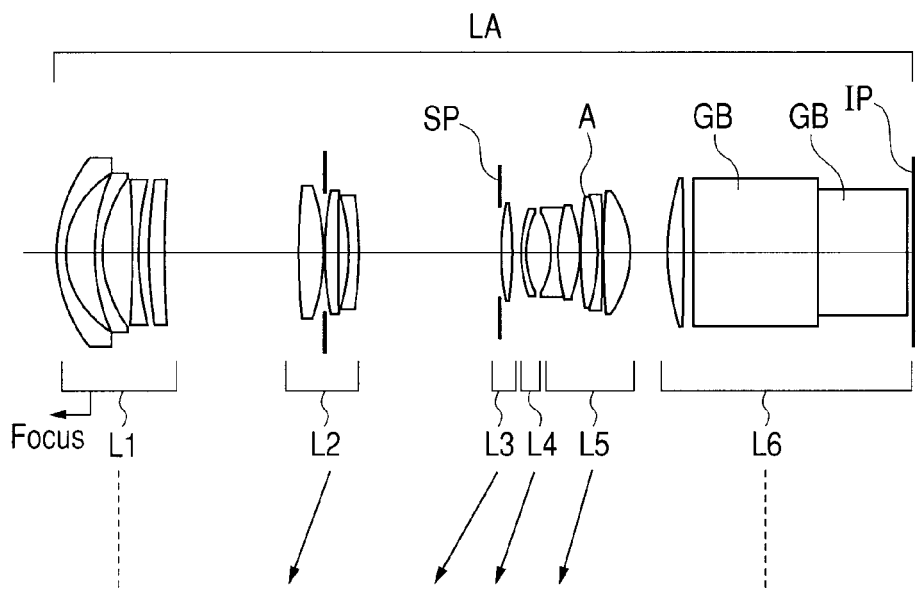
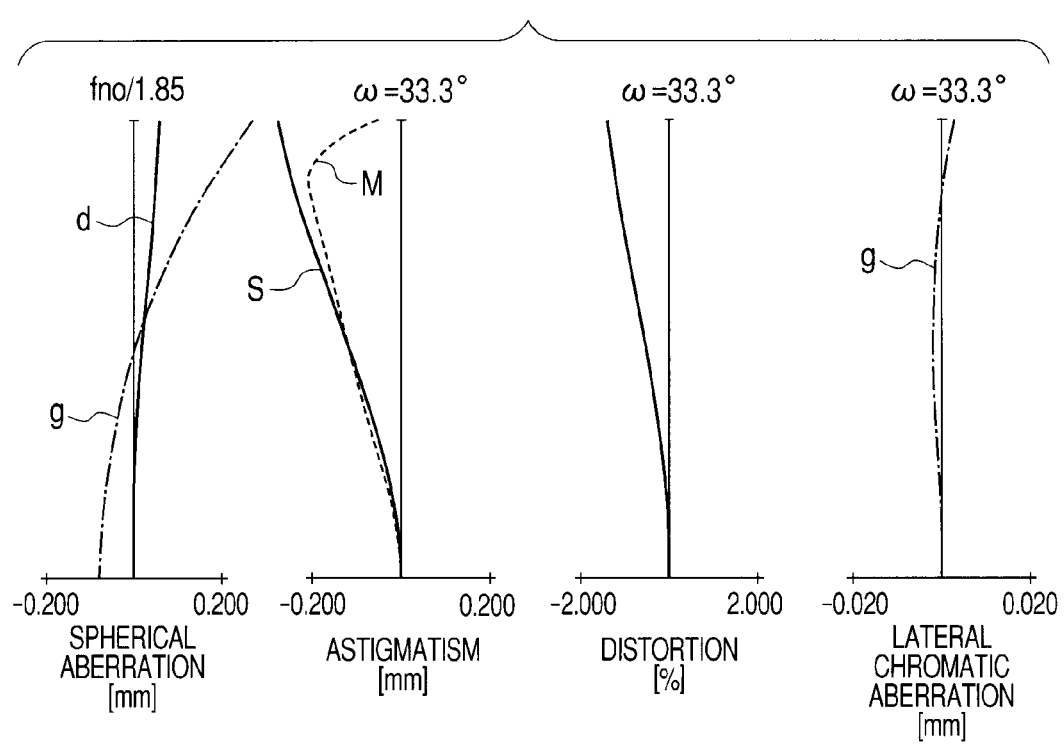

OPTICAL SYSTEM AND OPTICAL APPARATUS INCLUDING OPTICAL SYSTEM

BACKGROUND OF THE INVENTION

1. Field of the Invention

The present invention relates to an optical system, and more particularly, to an optical system suitable for an image pickup optical system of a silver-halide film camera, a digital still camera, or a video camera or for a projection optical system of a projector, and an optical apparatus including the optical system.

2. Description of the Related Art

In recent years, with the improvement of image quality of a digital image pickup apparatus, an image pickup element has been reduced in size. In particular, a size (area) per pixel has been reduced. With this reduction, an image pickup lens is also required to be a high-performance lens in which various aberrations are further reduced as compared with conventional lenses.

Up to now, a retrofocus (negative-lead-type) lens is known as a lens system advantageous to achieve a wide angle (wide field angle). In the retrofocus lens, a lens unit having a negative refractive power in total is provided on the front side in the optical system (on the subject side in a case of an image pickup optical system of a camera or the like, or on the screen side in a case of a projection optical system of a projector or the like).

A lens unit having a positive refractive power is provided on the rear side in the optical system (on the image side in a case of an image pickup optical system of a camera or the like, or on the original image side in a case of a projection optical system of a projector or the like), to thereby realize a short focal length and a long back focus.

The retrofocus lens has an asymmetrical refractive power arrangement in which the lens unit having the negative refractive power is provided on the front side in the optical system, and hence a negative distortion (barrel type distortion) is likely to be generated.

In order to reduce the negative distortion, a negative lens of the lens unit having the negative refractive power may be desirably made of a high-refractive index material. However, the high-refractive index material generally has high dispersion characteristic, and hence a negative lateral chromatic aberration is likely to be generated.

Japanese Patent Application Laid-Open No. H09-033801 discloses a retrofocus lens for use in the image pickup optical system. The retrofocus lens has a single focal length and includes a first lens unit having a negative refractive power and a second lens unit having a positive refractive power, which are provided in the stated order from the object side to the image side.

In Japanese Patent Application Laid-Open No. H09-033801, in order to correct a lateral chromatic aberration, the first lens unit having the negative refractive power is provided and a positive lens made of high-dispersion glass is provided in a lens unit close to the first lens unit. However, in such a structure, a high-order lateral chromatic aberration still remains without being corrected sufficiently enough. Therefore, a lateral chromatic aberration of a g-line in a high-image height portion (large-field angle region) is varied in a positive direction, and hence an excessive correction may be made.

Japanese Patent Application Laid-Open No. H06-082689 discloses a retrofocus lens for use in the projection optical system. The retrofocus lens has a single focal length and includes a first lens unit having a negative refractive power and a second lens unit having a positive refractive power, which are provided in the stated order from the screen side to the original image side.

In Japanese Patent Application Laid-Open No. H06-082689, in order to correct a negative lateral chromatic aberration, a positive lens made of a low-dispersion material with extraordinary partial dispersion is provided in the rear of an aperture stop in which a height "h" of a paraxial chief ray entering the lens (distance from an optical axis) is relatively high. However, in such a structure, a high-order lateral chromatic aberration still remains without being corrected sufficiently enough. Therefore, a lateral chromatic aberration of a g-line in a high-image height portion (large-field angle region) is varied in a positive direction, and hence an excessive correction may be made.

U.S. Pat. No. 7,426,079 discloses a retrofocus lens and a zoom lens for use in a retrofocus image pickup optical system. The retrofocus lens has a single focal length and includes a first lens unit having a negative refractive power and a second lens unit having a positive refractive power, which are provided in the stated order from the object side to the image side.

According to U.S. Pat. No. 7,426,079, in order to correct a negative lateral chromatic aberration, a high-dispersion resin material with extraordinary partial dispersion is used for a lens unit provided in the rear of an aperture stop in which the height "h" of the paraxial chief ray entering a lens surface (distance from optical axis) is relatively high. However, since the resin material is used for a lens, a power for the lens alone may not be increased. Therefore, aberrations except for chromatic aberrations cannot be sufficiently corrected. Even when the power of the lens is increased, various aberrations including a distortion at a reference wavelength remain because the lens is low in refractive index, and hence an additional lens for correcting the aberrations is necessary.

SUMMARY OF THE INVENTION

An optical system according to the present invention includes: an aperture stop; and a first positive lens provided in a reduction-conjugate side of the aperture stop, in which the following conditions are satisfied:

$$0.79 < \theta_{gFR} - (1.00 \times 10^{-4} \times v_{dR}^2 - 9.10 \times 10^{-3} \times v_{dR}) < 0.86,$$

$$10 < v_{dR} < 30, \text{ and}$$

$$0.5 < f_{GR}/f < 1.9,$$

where $f_{GR}$ indicates a focal length of the first positive lens, f indicates a focal length of the entire optical system, $N_{gR}$, $N_{FR}$, $N_{dR}$, and $N_{CR}$ indicate refractive indices of the first positive lens with respect to a g-line, an F-line, a d-line, and a C-line, respectively, and $\theta_{gFR}$ and $v_{dR}$ indicate a partial dispersion ratio and an Abbe number of the first positive lens respectively, and where $v_{dR}$ and $\theta_{gFR}$ are expressed as follows:

$$v_{dR} = (N_{dR} - 1)/(N_{FR} - N_{CR})$$

$$\theta_{gFR} = (N_{gR} - N_{FR})/(N_{FR} - N_{CR}).$$

According to the present invention, an optical system which is capable of excellently correcting chromatic aberrations and has high optical performance, and an optical apparatus including the optical system may be provided.

Further features of the present invention become apparent from the following description of exemplary embodiments with reference to the attached drawings.

BRIEF DESCRIPTION OF THE DRAWINGS

FIG. 1 is a lens cross sectional view illustrating Numerical Embodiment 1 of the present invention when an object distance is infinite.

FIG. 2 is a longitudinal aberration chart in Numerical Embodiment 1 of the present invention when the object distance is 1.6 m.

FIG. 3 is a lens cross sectional view illustrating Numerical Embodiment 2 of the present invention when a projection distance is infinite.

FIGS. 4A, 4B, and 4C are longitudinal aberration charts in Numerical Embodiment 2 of the present invention when the projection distance is 1.35 m.

DESCRIPTION OF THE EMBODIMENTS

Figure 4B:
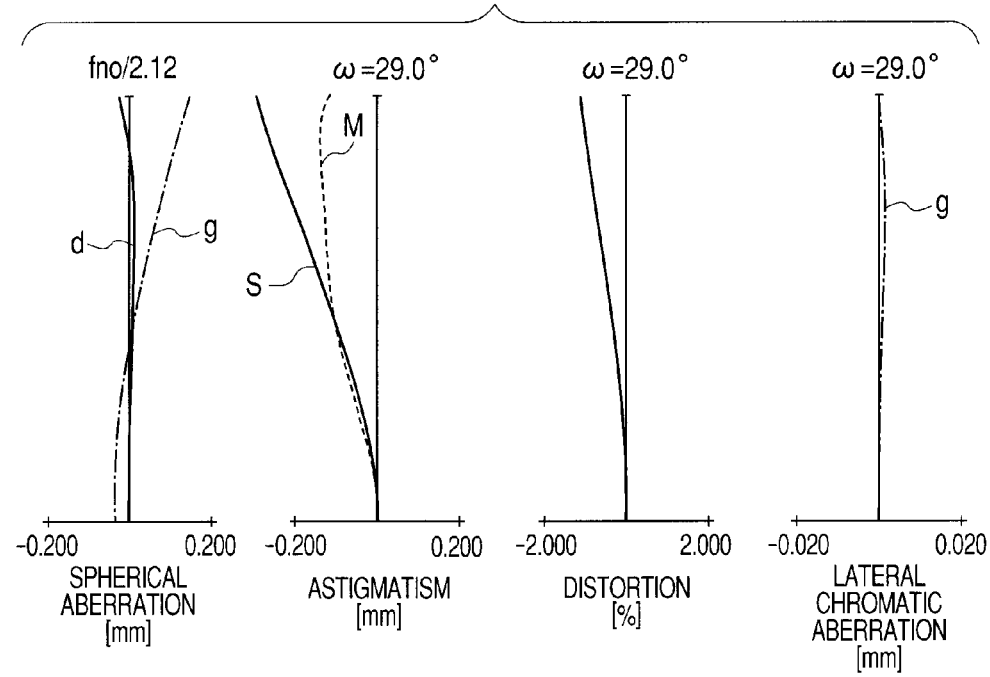

Preferred embodiments of the present invention will now be described in detail in accordance with the accompanying drawings.

Each of optical systems according to the present invention is any one of a lens system having a single focal length (Embodiment 1) and a zoom lens which includes, in the stated order from a magnifying conjugate side (magnifying side), a first lens unit having a negative refractive power and a second lens unit having a positive or negative refractive power (embodiments except Embodiment 1).

(Type 1)

Of the optical systems according to the embodiments, an optical system of Type-1, that is, the lens system having the single focal length is described.

In the lens system having the single focal length according to Embodiment 1, a first positive lens (positive lens A) satisfying the following conditions is included in a lens unit provided in the reduction conjugate side of an aperture stop. Assume that refractive indexes of a material of the first positive lens with respect to a g-line (435.8 nm in wavelength), an F-line (486.1 nm in wavelength), a d-line (587.6 nm in wavelength), and a C-line (656.3 nm in wavelength) are denoted by $N_{gR}$, $N_{FR}$, $N_{dR}$, and $N_{CR}$, respectively.

In this case, a partial dispersion ratio $\theta_{gFR}$ and an Abbe number $v_{dR}$ of the positive lens are defined as follows.

$$v_{dR} = (N_{dR} - 1)/(N_{FR} - N_{CR})$$

$$\theta_{gFR} = (N_{gR} - N_{FR})/(N_{FR} - N_{CR})$$

When a focal length of the first positive lens is expressed by $f_{GR}$ and a focal length of the entire system is expressed by f, the first positive lens satisfies the following conditions.

$$0.79 < \theta_{gFR} - (1.00 - 10^{-4} \times v_{dR}^2 - 9.10 \times 10^{-3} \times v_{dR}) < 0.86 \quad (1)$$

$$10 < v_{dR} < 30 \quad (2)$$

$$0.5 < f_{GR}/f < 1.9 \quad (3)$$

Further, of multiple negative lenses located in the reduction conjugate side of the aperture stop, a first negative lens which has a minimum Abbe number with respect to the d-line satisfies the following condition:

$$0 < \left| \frac{v_{NRmin} \times f_{NR}}{f} \right| < 25 \quad (4)$$

where $v_{NRmin}$ indicates the Abbe number of the first negative lens and $f_{NR}$ indicates a focal length of the first negative lens.

Further, the first positive lens satisfies the following condition.

$$1.7 < N_{dR} < 2.2 \quad (5)$$

Further, in the optical lens according to Embodiment 1, among positive lenses except the first positive lens which are located in the reduction-conjugate side of the aperture stop, a second positive lens which has a maximum Abbe number with respect to the d-line satisfies the following condition:

$$65 < v_{PRmax} < 98 \quad (6)$$

where $v_{PRmax}$ indicates the Abbe number of the second positive lens.

The lens system having the single focal length as described above may desirably have a back focus longer than the focal length. The back focus refers to a distance between an image plane and a reduction-conjugate-side surface of a lens disposed on the most reduction-conjugate side. When there is a glass block (such as a prism or a low-pass filter) on an optical path, the back focus is obtained by adding an equivalent air value corresponding to the thickness of the glass block (value obtained by converting the thickness of the glass block into an air value) and an air distance except for the thickness of the glass block.

(Type-2)

Next, of the optical systems according to the embodiments, an optical system of Type-2, that is, the zoom lens is described below.

The zoom lens which is one of the optical systems according to the embodiments includes, in order from the magnifying conjugate side, a first lens unit having a negative refractive power and a rear group having a positive or negative refractive power. An interval between the units is changed during zooming. A first positive lens (positive lens A) is provided in the reduction conjugate side of the aperture stop. The first positive lens satisfies the following Conditional Expressions (7), (8), and (9).

Assume that a partial dispersion ratio of a material of the first positive lens, an Abbe number of the first positive lens, and a focal length of the first positive lens are denoted by $\theta_{gFz}$, $\nu_{dz}$, and $f_{Gz}$, respectively. In addition, assume that a focal length of the entire system at a wide angle end and a focal length of the entire system at a telephoto end are denoted by $f_W$ and $f_T$, respectively. In this case, the following conditions are satisfied.

$$0.79 < \theta_{gFz} - (1.00 \times 10^{-4} \times \nu_{dz}^2 - 9.10 \times 10^{-3} \times \nu_{dz}) < 0.86 \quad (7)$$

$$10 < \nu_{dz} < 30 \quad (8)$$

$$0.5 < f_{Gz}/\sqrt{f_W \times f_T} < 1.9 \quad (9)$$

The partial dispersion ratio and the Abbe number are the same as defined in (Type-1). That is, when refractive indices of a material of the first positive lens with respect to the g-line (435.8 nm in wavelength), the F-line (486.1 nm in wavelength), the d-line (587.6 nm in wavelength), and the C-line (656.3 nm in wavelength) are denoted by $N_{gz}$, $N_{Fz}$, $N_{dz}$, and $N_{Cz}$, respectively, an Abbe number $\nu_{dz}$ and a partial dispersion ratio $\theta_{gFz}$ are expressed as follows.

$$\nu_{dz} = (N_{dz} - 1)/(N_{Fz} - N_{Cz})$$

$$\theta_{gFz} = (N_{gz} - N_{Fz})/(N_{Fz} - N_{Cz})$$

The zoom lens includes a first lens unit which is provided on the most magnifying-conjugate side and has a negative refractive power and a second lens unit which is provided in the reduction-conjugate side of the first lens unit and has a positive refractive power. The rear group described above may include only the second lens unit (Embodiment 4) or may include the second lens unit and a lens unit except the second lens unit. Of the lens units included in the zoom lens, a lens unit located on the most reduction-conjugate side may desirably be a lens unit having a positive refractive power.

Of multiple negative lenses located in the reduction-conjugate side of the aperture stop (surface), a first negative lens which has a minimum Abbe number with respect to the d-line satisfies the following condition:

$$0 < \left| \frac{\nu_{Nzmin} \times f_{Nz}}{\sqrt{f_W \times f_T}} \right| < 25 \quad (10)$$

where $\nu_{Nzmin}$ indicates the Abbe number of the first negative lens and $f_{Nz}$ indicates a focal length of the first negative lens.

Further, the first positive lens may preferably satisfy the following condition:

$$1.7 < N_{dz} < 2.2 \quad (11)$$

Among positive lenses except the first positive lens which are located in the reduction-conjugate side of the aperture stop, a second positive lens which has a maximum Abbe number with respect to the d-line satisfies the following condition:

$$65 < \nu_{Pzmax} < 98 \quad (12)$$

where $\nu_{Pzmax}$ indicates the Abbe number of the second positive lens.

Effects corresponding to the structures as described above are described below.

The retrofocus optical system as described in each of the embodiments of the present invention has a refractive power arrangement asymmetrical with respect to the position of the aperture stop. When the optical system having the asymmetric refractive power arrangement as described above is increased in field angle, both a low-order distortion and a high-order distortion are likely to be generated. This may be said even of a wavelength other than the reference wavelength. Both large amounts of low-order and high-order chromatic aberrations (color distortions) are likely to be generated.

The low-order distortion or the low-order lateral chromatic aberration is represented as a three-order aberration coefficient in a paraxial theory. The high-order distortion or the high-order lateral chromatic aberration is represented as an aberration coefficient of at least five orders.

When the large amount of low-order aberration as described above is generated, the amount of change of aberration due to a change in image height becomes larger. When the large amount of high-order aberration is generated, an inflection point (large inflection point) appears in an aberration curve because of the change in image height, and hence the aberration curve bends. In order to excellently correct various aberrations in the structure described above, the number of lenses of each of the lens units may desirably be increased to expand the degree of freedom of design. However, when the number of lenses increases, there is a demerit that the entire lens system is increased in size and weight.

In the case of the retrofocus optical system according to each of the embodiments, an on-axis chromatic aberration is likely to be generated on the optical path in the vicinity of the aperture stop in which an on-axis light beam diameter is the maximum. In the structure described above, in order to excellently correct (reduce) the on-axis chromatic aberration, a lens which has a positive power and is made of a material having an extraordinary partial dispersion characteristic in which a deviation ($\Delta\theta_{gF}$) from a reference line is a positive value may desirably be used in the vicinity of the aperture stop. However, when a lens which has a positive power and is made of a material having an extraordinary partial dispersion characteristic in which the deviation ($\Delta\theta_{gF}$) from the reference line is a positive value is provided in the magnifying-conjugate side of the aperture stop, the on-axis chromatic aberration is corrected, but the lateral chromatic aberration further increases. Note that the reference line is a straight line expressed by "$\theta_{gF} = -1.625 \times 10^{-3} \times \nu_d + 0.642$".

In each of the embodiments of the present invention, the positive lens A (first positive lens) satisfying Conditional Expressions (1) to (3) or Conditional Expressions (7) to (9) is provided in the reduction-conjugate side of an aperture stop SP.

Therefore, various aberrations generated in a first lens unit L1, particularly, a difference between lateral chromatic aberration amounts with respect to the g-line and the F-line is reduced to correct the on-axis chromatic aberration generated in the vicinity of the aperture stop SP. When the lens structure as described above is employed, the amount of on-axis chromatic aberration and the amount of lateral chromatic aberration generated in the entire optical system are reduced across the entire screen.

Next, the technical meanings of the conditional expressions described above are described in more detail. Note that Conditional Expressions (1) to (3) correspond to Conditional Expressions (7) to (9), and Conditional Expressions (1) to (3) correspond to a case where the optical systems according to the present invention include the single-focus lens and Conditional Expressions (7) to (9) correspond to a case where the optical systems include the magnification-variable zoom lens.

Conditional Expressions (1) and (7) each relate to the partial dispersion ratio of the positive lens A (first positive lens) provided in the reduction-conjugate side of the aperture stop SP in the retrofocus lens. When the conditions of the upper limits of Conditional Expressions (1) and (7) are not satisfied, the partial dispersion ratio becomes large, and hence there is an effect of reducing a difference in each of the on-axis chromatic aberration amount and the lateral chromatic aberration amount between the g-line and the F-line. However, a difference in each of the on-axis chromatic aberration amount and the lateral chromatic aberration amount between the g-line and the C-line widens, and it becomes difficult to reduce the difference. Therefore, it is unavoidable to increase the number of lenses, and hence the entire lens system is increased in size and weight. On the other hand, when the conditions of the lower limits of Conditional Expressions (1) and (7) are not satisfied, the partial dispersion ratio becomes small, and hence a power for correcting a high-order chromatic aberration weakens. Thus, in order to reduce a remaining high-order chromatic aberration, it is unavoidable to increase the number of lenses, and hence the entire lens system is increased in size and weight.

Conditional Expressions (1) and (7) may be more preferably set as follows.

$$0.793 < \theta_{gFR} - (1.00 \times 10^{-4} \times vdR^2 - 9.10 \times 10^{-3} \times v_{dR}) < 0.85 \quad (1a)$$

$$0.793 < \theta_{gFz} - (1.00 \times 10^{-4} \times v_{dz}^2 - 9.10 \times 10^{-3} \times v_{dz}) < 0.85 \quad (7a)$$

Conditional Expressions (1) and (7) may further more preferably set as follows.

$$0.796 < \theta_{gFR} - (1.00 \times 10^{-4} \times v_{dR}^2 - 9.10 \times 10^{-3} \times v_{dR}) < 0.84 \quad (1b)$$

$$0.796 < \theta_{gFz} - (1.00 \times 10^{-4} \times v_{dz}^2 - 9.10 \times 10^{-3} \times v_{dz}) < 0.84 \quad (7b)$$

Conditional Expressions (2) and (8) each relate to the Abbe number value of the positive lens A provided in the reduction-conjugate side of the aperture stop SP. When the conditions of the upper limits of Conditional Expressions (2) and (8) are not satisfied, the positive lens A is reduced in dispersion, and hence the effect of reducing the difference in each of the on-axis chromatic aberration amount and the lateral chromatic aberration amount between the g-line and the F-line becomes smaller. Therefore, in order to obtain the same effect, it is necessary to provide the positive lens A with a large power, and hence it becomes difficult to correct other various aberrations. On the other hand, when the conditions of the lower limits of Conditional Expressions (2) and (8) are not satisfied, the positive lens A is increased in dispersion. Therefore, the effect of reducing the difference in each of the on-axis chromatic aberration amount and the lateral chromatic aberration amount between the g-line and the F-line becomes larger. However, a difference between the g-line and the C-line widens, and it becomes difficult to reduce the difference. Thus, it is unavoidable to increase the number of lenses, and hence the entire lens system is increased in size and weight.

Conditional Expressions (2) and (8) may be more preferably set as follows.

$$15 < v_{dR} < 29 \quad (2a)$$

$$15 < v_{dz} < 29 \quad (8a)$$

Conditional Expressions (3) and (9) each relate to the refractive power of the positive lens A provided in the reduction-conjugate side of the aperture stop SP. When the conditions of the upper limits of Conditional Expressions (3) and (9) are not satisfied, the refractive power of the positive lens A (first positive lens) provided in the reduction-conjugate side of the aperture stop SP weakens, and hence the effect of reducing the difference in each of the on-axis chromatic aberration amount and the lateral chromatic aberration amount between the g-line and the F-line becomes smaller. Therefore, in order to correct a remaining high-order chromatic aberration, it is unavoidable to increase the number of lenses, and hence the entire lens system is increased in size and weight. On the other hand, when the conditions of the lower limits of Conditional Expressions (3) and (9) are not satisfied, the refractive power of the positive lens A provided in the reduction-conjugate side of the aperture stop SP becomes too strong, which is not preferable because it becomes difficult to correct the difference in each of the on-axis chromatic aberration amount and the lateral chromatic aberration amount between the g-line and the C-line.

In order to further improve the optical performance, the numerical ranges of Conditional Expressions (3) and (9) are preferably set as follows.

$$0.8 < f_{GR}/f < 1.85 \quad (3a)$$

$$0.8 < f_{Gz}/\sqrt{f_W \times f_T} < 1.85 \quad (9a)$$

According to each of the embodiments, when the respective structural conditions are specified as described above, the chromatic aberrations may be excellently corrected across the entire screen in the retrofocus imaging optical system, and hence a high-quality image may be obtained.

Next, when Condition Expressions (4) and (10), Conditional Expressions (5) and (11), or Conditional Expressions (6) and (12) are satisfied, more excellent optical performance may be obtained.

Conditional Expressions (4) and (10) each relate to a power, for correcting the chromatic aberration, of the negative lens provided in the reduction-conjugate side of the aperture stop. When the conditions of the upper limits of Conditional Expressions (4) and (10) are not satisfied, the chromatic aberration correction power of the negative lens provided in the reduction-conjugate side of the aperture stop weakens. Therefore, in order to correct a remaining chromatic aberration, it is unavoidable to increase the number of lenses, and hence the entire lens system is increased in size and weight. On the other hand, when the conditions of the lower limits of Conditional Expressions (4) and (10) are not satisfied, the focal length of the negative lens provided in the reduction-conjugate side of the aperture stop is reduced to zero, and hence it becomes difficult to perform balanced aberration correction.

In order to further improve the optical performance, the numerical ranges of Conditional Expressions (4) and (10) are preferably set as follows.

$$5 < \left| \frac{v_{NRmin} \times f_{NR}}{f} \right| < 20 \quad (4a)$$

$$5 < \left| \frac{v_{Nzmin} \times f_{Nz}}{\sqrt{f_W \times f_T}} \right| < 20 \quad (10a)$$

Conditional Expressions (5) and (11) each relate to a refractive index value of the positive lens A (first positive lens) provided in the reduction-conjugate side of the aperture stop SP. It is difficult to use, as an optical member, a material in which the conditions of the upper limits of Conditional Expressions (5) and (11) are not satisfied. On the other hand, when the conditions of the lower limits of Conditional Expressions (5) and (11) are not satisfied, the aberration correction power (particularly, distortion correction power) at the reference wavelength weakens, and hence it becomes difficult to correct various aberrations in a balanced manner.

Conditional Expressions (5) and (11) may be more preferably set as follows.

$$1.71<N_{dR}<2.0 \tag{5a}$$

$$1.71<N_{dz}<2.0 \tag{11a}$$

Conditional Expressions (6) and (12) each relate to a maximum Abbe number of the positive lens provided in the reduction-conjugate side of the aperture stop. When the conditions of the upper limits of Conditional Expressions (6) and (12) are not satisfied, the positive lens provided in the reduction conjugate side of the aperture stop becomes too low in dispersion, and hence the chromatic aberration is excessively corrected. On the other hand, when the conditions of the lower limits of Conditional Expressions (6) and (12) are not satisfied, the positive lens provided in the reduction-conjugate side of the aperture stop becomes high in dispersion. Therefore, in order to correct the chromatic aberration in a balanced manner, it is unavoidable to increase the number of lenses, and hence the entire lens system is increased in size and weight.

In order to further improve the optical performance, the numerical ranges of Conditional Expressions (6) and (12) are preferably set as follows.

$$70<v_{PRmax}<96 \tag{6a}$$

$$70<v_{Pzmax}<96 \tag{12a}$$

Next, the structures of the imaging optical systems according to the embodiments are described in detail with reference to the attached drawings.

First, lens cross sectional views of the embodiments are described.

In the lens cross sectional views (FIGS. 1, 3, 5, 7, 9, 11, and 13), reference symbol LA denotes an imaging optical system LA, SP denotes an aperture stop, L1 denotes a first lens unit, L2 denotes a second lens unit, L3 denotes a third lens unit, L4 denotes a fourth lens unit, L5 denotes a fifth lens unit, L6 denotes a sixth lens unit, and LF denotes a floating lens unit. An image plane IP corresponds to a solid-state image pickup element (photoelectric transducer) or an original image (projection image) of a liquid crystal panel (liquid crystal display apparatus).

In the aberration charts, a d-line and a g-line are represented by reference symbols d and g, respectively, and a meridional image plane and a sagittal image plane are represented by reference symbols M and S, respectively. A lateral chromatic aberration is expressed by a g-line. An f-number is represented by reference symbol fno and a half field angle is denoted by reference symbol ω.

In the aberration charts (FIG. 2) with respect to Embodiment 1, a spherical aberration curve is drawn at a scale of 0.4 mm, an astigmatism curve is drawn at a scale of 0.4 mm, a distortion curve is drawn at a scale of 2%, and a lateral chromatic aberration curve is drawn at a scale of 0.05 mm. In aberration charts (FIGS. 4A, 4B, and 4C) with respect to Embodiment 2, a spherical aberration curve is drawn at a scale of 0.2 mm, an astigmatism curve is drawn at a scale of 0.2 mm, a distortion curve is drawn at a scale of 2%, and a lateral chromatic aberration curve is drawn at a scale of 0.02 mm. In aberration charts (FIGS. 6A, 6B, and 6C) with respect to Embodiment 3, a spherical aberration curve is drawn at a scale of 0.4 mm, an astigmatism curve is drawn at a scale of 0.4 mm, a distortion curve is drawn at a scale of 2%, and a lateral chromatic aberration curve is drawn at a scale of 0.05 mm. In aberration charts (FIGS. 8A, 8B, and 8C) with respect to Embodiment 4, a spherical aberration curve is drawn at a scale of 0.4 mm, an astigmatism curve is drawn at a scale of 0.4 mm, a distortion curve is drawn at a scale of 5%, and a lateral chromatic aberration curve is drawn at a scale of 0.05 mm. In aberration charts (FIGS. 10A, 10B, and 10C) with respect to Embodiment 5, a spherical aberration curve is drawn at a scale of 0.2 mm, an astigmatism curve is drawn at a scale of 0.2 mm, a distortion curve is drawn at a scale of 2%, and a lateral chromatic aberration curve is drawn at a scale of 0.02 mm. In aberration charts (FIGS. 12A, 12B, and 12C) with respect to Embodiment 6, a spherical aberration curve is drawn at a scale of 0.4 mm, an astigmatism curve is drawn at a scale of 0.4 mm, a distortion curve is drawn at a scale of 5%, and a lateral chromatic aberration curve is drawn at a scale of 0.05 mm. In aberration charts (FIGS. 14A, 14B, and 14C) with respect to Embodiment 7, a spherical aberration curve is drawn at a scale of 0.1 mm, an astigmatism curve is drawn at a scale of 0.1 mm, a distortion curve is drawn at a scale of 5%, and a lateral chromatic aberration curve is drawn at a scale of 0.02 mm.

A wide angle end corresponds to a case of a minimum focal length and a telephoto end corresponds to a case of a maximum focal length. To be specific, in each of Embodiments 2 to 5 and 7, the wide angle end and the telephoto end correspond to cases where the second lens unit L2 for varying magnification is located on one of both ends of a range in which the second lens unit is movable in the optical axis direction in view of mechanisms. In Embodiment 6, the wide angle end and the telephoto end correspond to cases where the fourth lens unit L4 is located on one of both ends of a range in which the fourth lens unit is movable in the optical axis direction.

[Embodiment 1]

The imaging optical system according to Embodiment 1 is a wide-field angle lens having a half field angle of 40.9°. FIG. 1 is a lens cross sectional view illustrating the imaging optical system according to Embodiment 1 of the present invention. FIG. 2 is a longitudinal aberration chart in a case where an object distance (which is a distance from the image plane IP (the same is applied in the following description)) of the imaging optical system according to Embodiment 1 is 1.6 m.

The imaging optical system LA according to Embodiment 1 is a single-focus lens including, in order from the magnifying conjugate side, a fixed lens unit $L_{Fix}$ having a negative refractive power, a first floating lens unit LF1 having a positive refractive power, the aperture stop SP, and a second floating lens unit LF2 having a positive refractive power.

The fixed lens unit $L_{Fix}$ is not moved for focusing. The first floating lens unit LF1 is moved to the magnifying conjugate side during focusing from an infinite-distance object to a short-distance object. The second floating lens unit LF2 is also moved to the magnifying conjugate side during focusing from the infinite-distance object to the short-distance object. In this case, the first floating lens unit LF1 and the second floating lens unit LF2 are moved to the magnifying conjugate side while an interval between the first floating lens unit LF1 and the second floating lens unit LF2 is reduced. The aperture stop SP is moved together with the second floating lens unit LF2.

In the second floating lens unit LF2, a positive lens A($N_d$=1.73000, $v_d$=26.0, and $\theta_{gF}$=0.635) provided closest to the image plane IP satisfies Conditional Expressions (1) to (3).

In Embodiment 1, at least one lens unit which is moved or not moved during focusing may be further provided in the reduction-conjugate side of the second floating lens unit LF2.

[Embodiment 2]

Figure 4C:
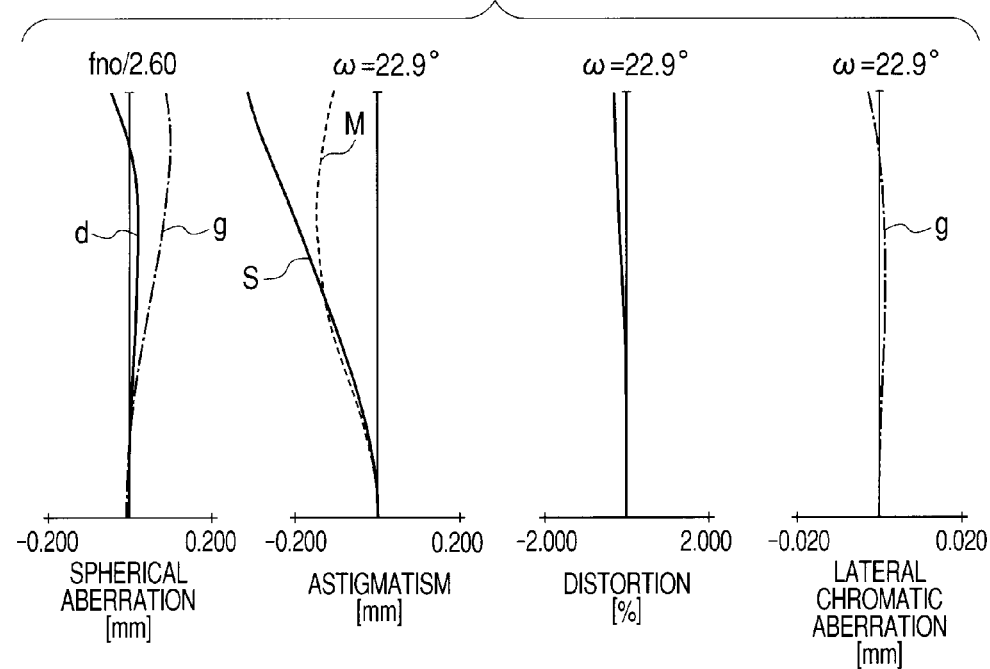

Embodiment 2 describes a zoom lens of which a half field angle at the wide angle end is 33.3°, a half field angle at the telephoto end is 22.9°, and a zoom ratio is 1.56. FIG. 3 is a lens cross sectional view illustrating an imaging optical system according to Embodiment 2 of the present invention at the wide angle end. FIGS. 4A, 4B, and 4C are respective longitudinal aberration charts at the wide angle end, an intermediate zoom position, and the telephoto end in a case where the object distance of the imaging optical system according to Embodiment 2 is 1.35 m.

The imaging optical system according to Embodiment 2 includes, in order from the magnifying conjugate side, a first, second, third, fourth, fifth, and sixth lens units L1 to L6 which are provided. The first, second, third, fourth, fifth, and sixth lens units L1 to L6 have a negative refractive power, a positive refractive power, a positive refractive power, a negative refractive power, a positive refractive power, and a positive refractive power, respectively.

The first lens unit L1 is moved to the magnifying conjugate side during focusing from the infinite distance to the short distance. During zooming from the wide angle end to the telephoto end, the first lens unit L1 and the sixth lens unit L6 are not moved. During zooming from the wide angle end to the telephoto end, the second, third, fourth, and fifth lens units L2, L3, L4, and L5 are moved to the magnifying conjugate side to vary magnification or to correct an image plane variation due to magnification.

In this embodiment, the second, third, fourth, and fifth lens units L2, L3, L4, and L5 are moved independently from one another during zooming.

The third lens unit L3 includes the aperture stop SP. A positive lens A ($N_d$=1.77071, $v_d$=23.0, and $\theta_{gF}$=0.668) provided in the reduction-conjugate side of the aperture stop SP satisfies Conditional Expressions (7) to (9).

Glass blocks GB correspond to a color combining prism, a polarizing filter, a color filter, or the like.

[Embodiment 3]

Figure 5:
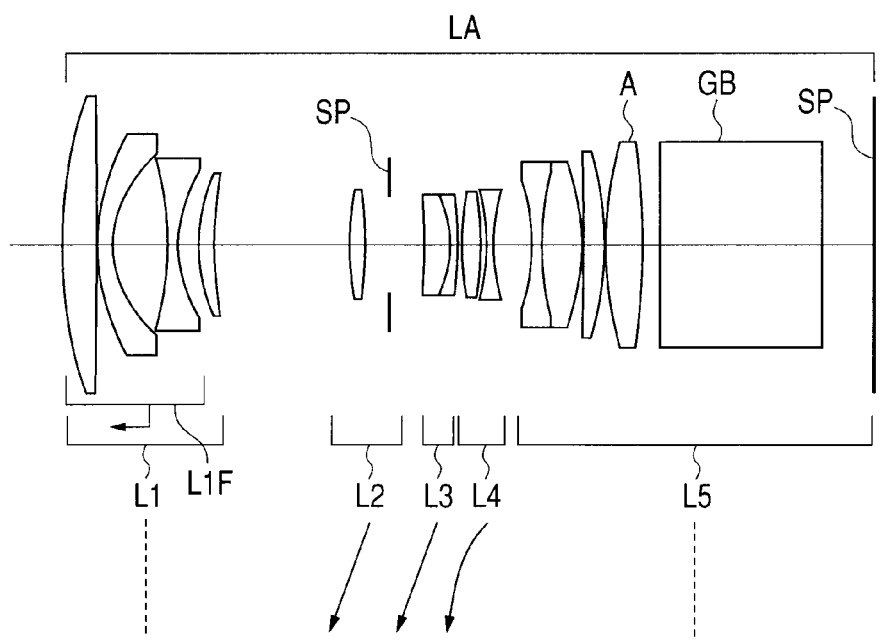
FIG. 5 is a lens cross sectional view illustrating Numerical Embodiment 3 of the present invention when the projection distance is infinite.
Figure 6A:
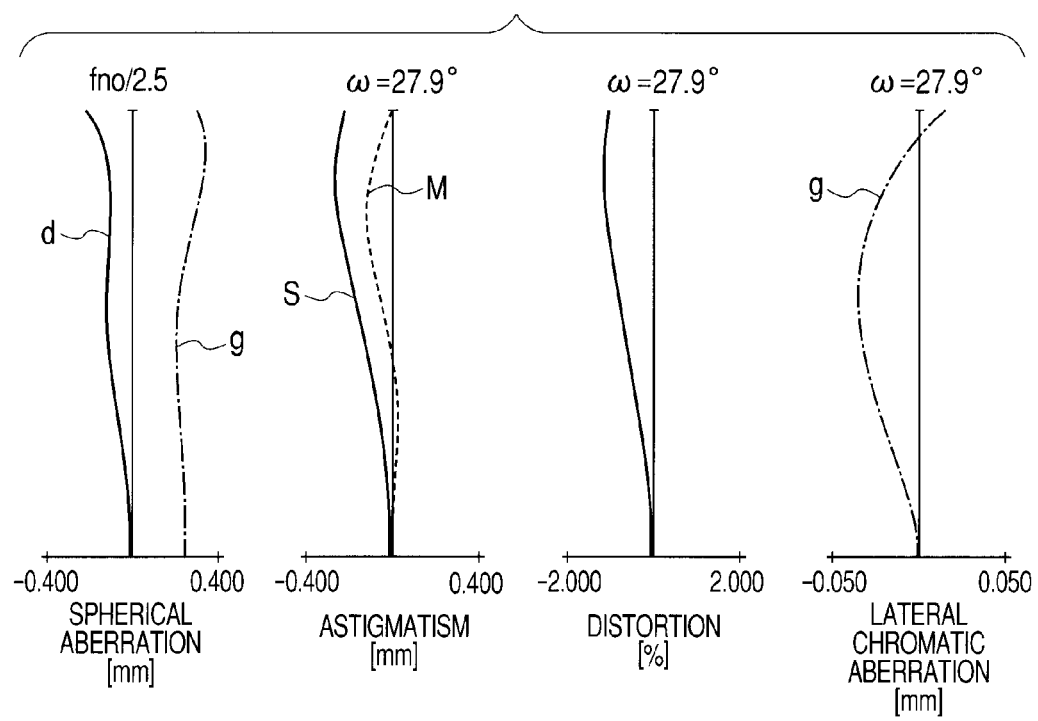
FIGS. 6A, 6B, and 6C are longitudinal aberration charts in Numerical Embodiment 3 of the present invention when the projection distance is 2.5 m.
Figure 6B:
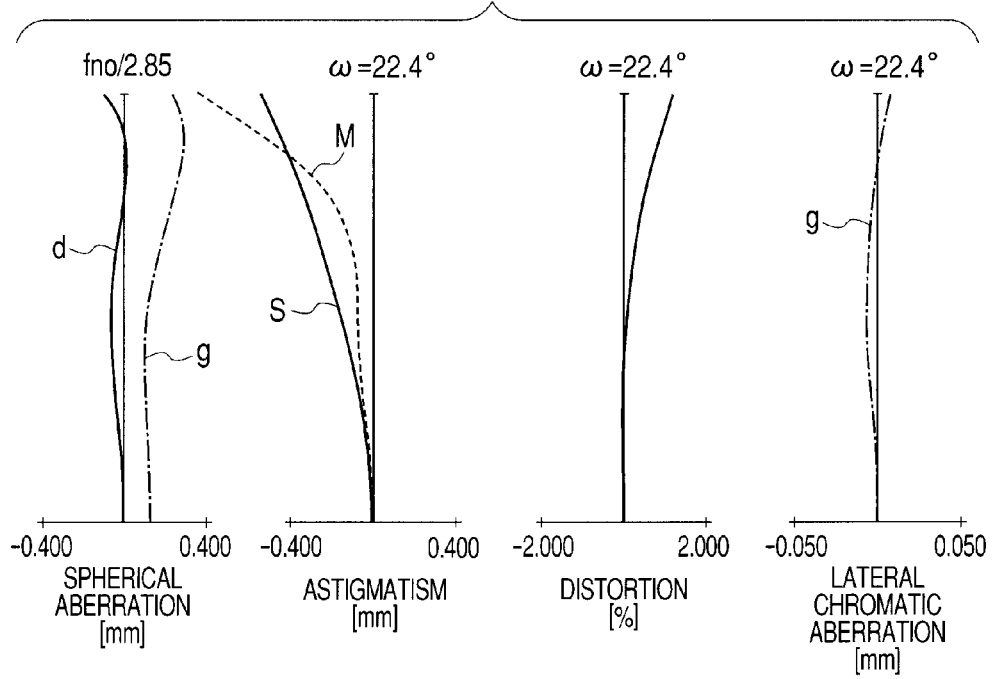
Figure 6C:
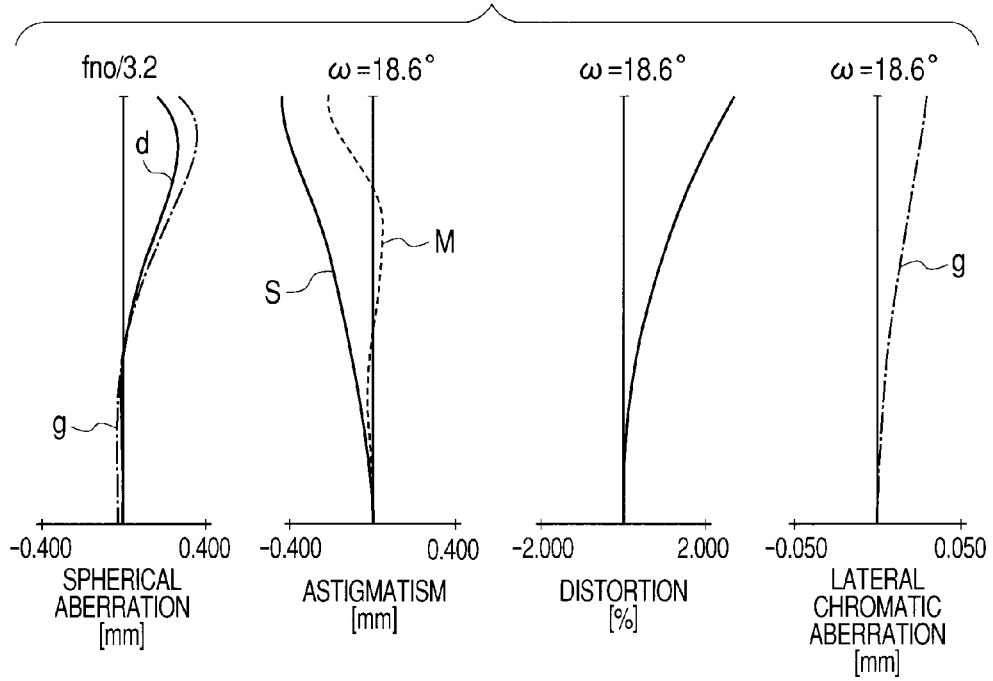

Embodiment 3 describes a zoom lens of which a half field angle at the wide angle end is 27.9°, a half field angle at the telephoto end is 18.6°, and a zoom ratio is 1.58. FIG. 5 is a lens cross sectional view illustrating an imaging optical system according to Embodiment 3 of the present invention at the wide angle end. FIGS. 6A, 6B, and 6C are respective longitudinal aberration charts at the wide angle end, an intermediate zoom position, and the telephoto end in a case where the object distance of the imaging optical system according to Embodiment 3 is 2.5 m.

The imaging optical system according to Embodiment 3 includes, in order from the magnifying conjugate side, a first lens group L1 having a negative refractive power, a second lens unit L2 having a positive refractive power, a third lens unit L3 having a positive refractive power, a fourth lens unit L4 having a negative refractive power, and a fifth lens unit L5 having a positive refractive power.

During focusing from the infinite distance to the short distance, a focusing unit L1F included in the first lens group L1 is moved to the magnifying conjugate side. During zooming from the wide angle end to the telephoto end, the first lens unit L1 and the fifth lens unit L5 are not moved. During zooming from the wide angle end to the telephoto end, the second, third, and fourth lens units L2, L3, and L4 are moved to the magnifying conjugate side to vary magnification or to correct an image plane variation due to magnification. In this embodiment, the second, third, and fourth lens units L2, L3, and L4 are moved independently from one another during zooming.

The second lens unit L2 includes the aperture stop SP. A positive lens A($N_d$=1.77071, $v_d$=23.0, and $\theta_{gF}$=0.668) provided in the reduction-conjugate side of the aperture stop SP and closest to the image plane IP satisfies Conditional Expressions (7) to (9).

Glass blocks GB correspond to a color combining prism, a polarizing filter, a color filter or the like.

[Embodiment 4]

Figure 7:
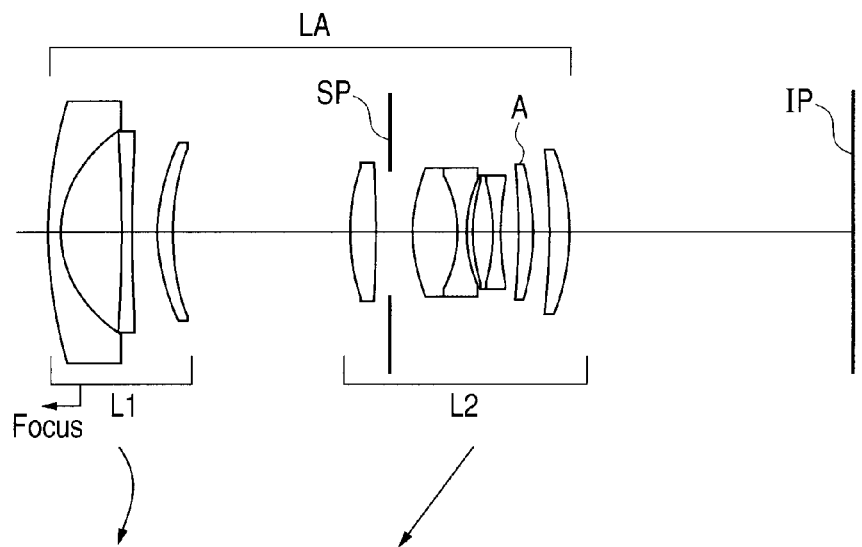
FIG. 7 is a lens cross sectional view illustrating Numerical Embodiment 4 of the present invention when the object distance is infinite.
Figure 8A:
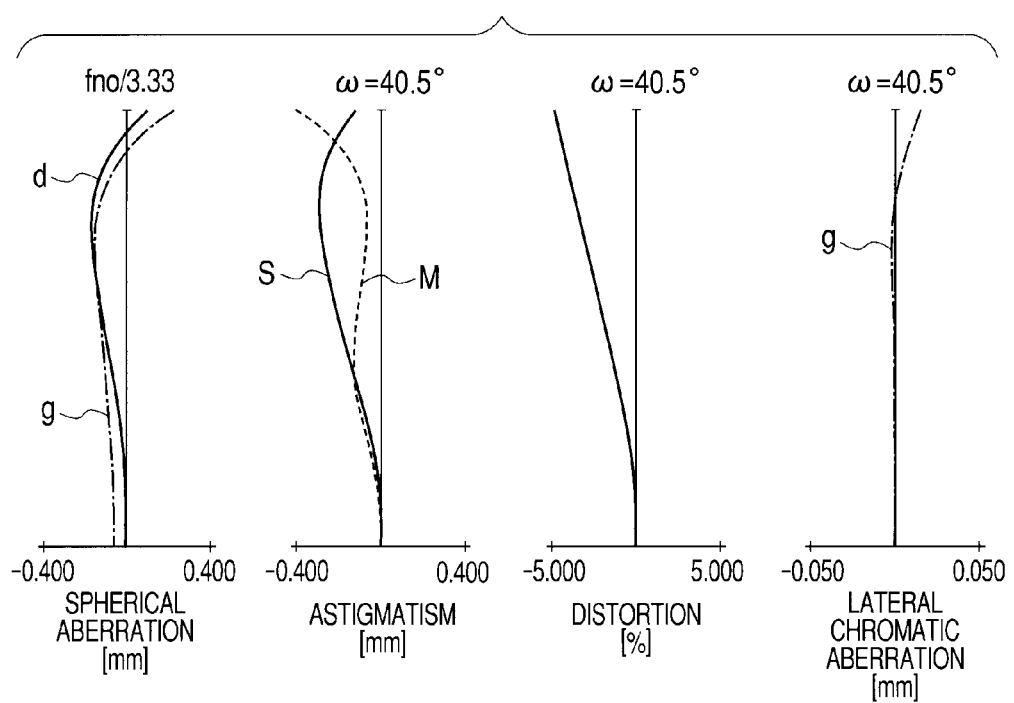
FIGS. 8A, 8B, and 8C are longitudinal aberration charts in Numerical Embodiment 4 of the present invention when the object distance is 1.2 m.
Figure 8B:
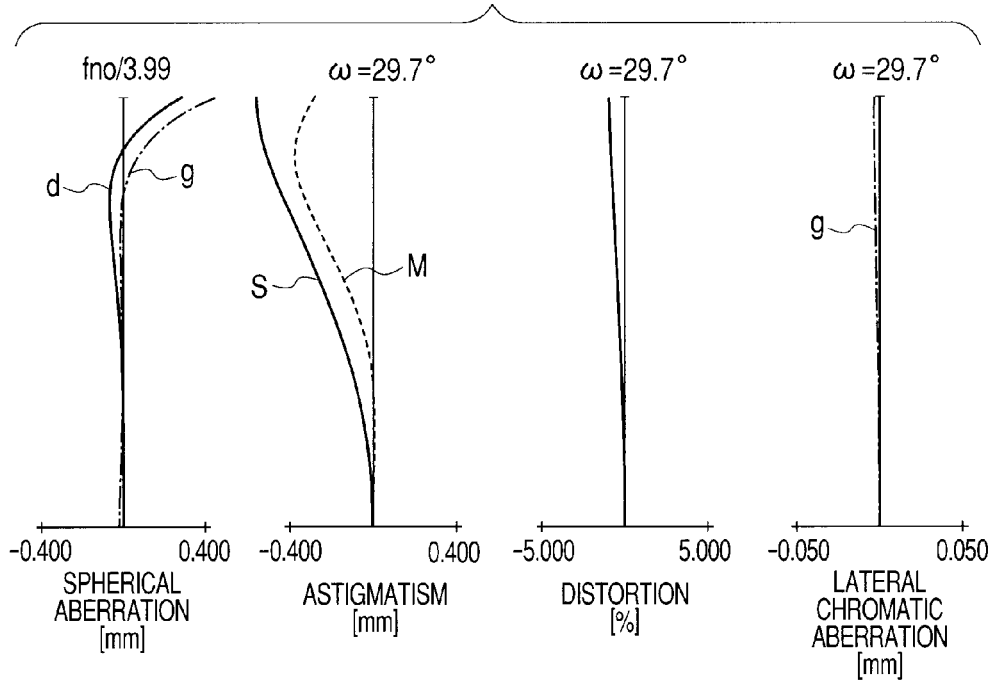
Figure 8C:
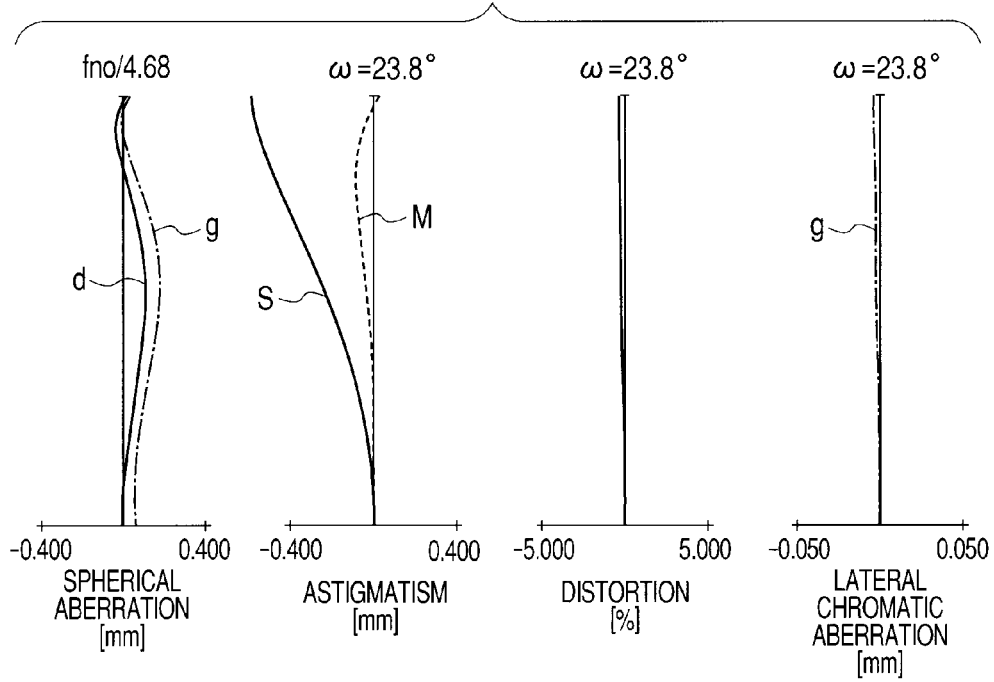

Embodiment 4 describes a zoom lens of which a half field angle at the wide angle end is 40.5°, a half field angle at the telephoto end is 23.8°, and a zoom ratio is 1.93. FIG. 7 is a lens cross sectional view illustrating an imaging optical system according to Embodiment 4 of the present invention at the wide angle end. FIGS. 8A, 8B, and 8C are respective longitudinal aberration charts at the wide angle end, an intermediate zoom position, and the telephoto end in a case where the object distance of the imaging optical system according to Embodiment 4 is 1.2 m.

The imaging optical system according to Embodiment 4 includes, in order from the magnifying conjugate side, a first lens unit L1 having a negative refractive power and a second lens unit L2 having a positive refractive power. During focusing from the infinite distance to the short distance, the first lens unit L1 is moved to the magnifying conjugate side. During zooming from the wide angle end to the telephoto end, the first lens unit L1 and the second lens unit L2 are moved. In, this embodiment, the first and second lens units L1 and L2 are moved independently from one another during zooming.

The second lens unit L2 includes the aperture stop SP. A positive lens A($N_d$=1.77071, $v_d$=23.0, and $\theta_{gF}$=0.668) provided in the reduction-conjugate side of the aperture stop SP satisfies Conditional Expressions (7) to (9)

[Embodiment 5]

Figure 9:
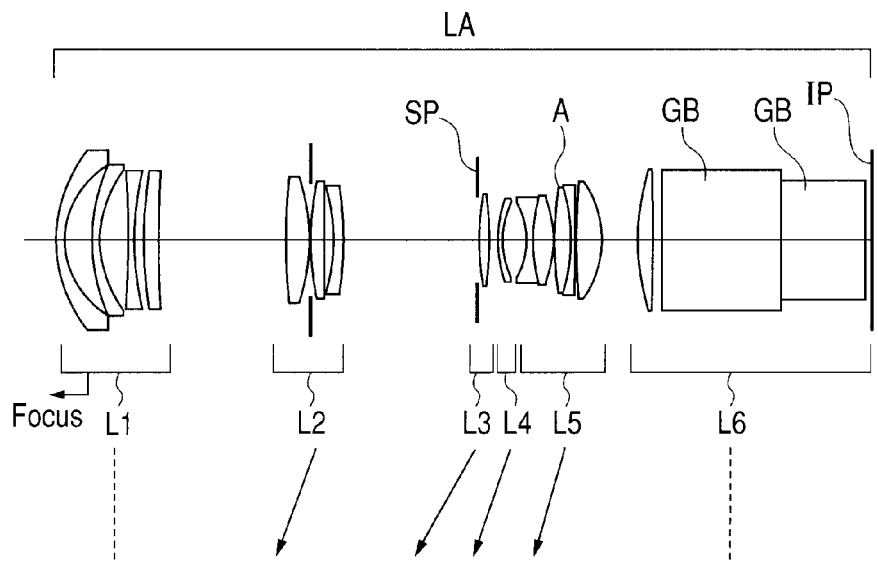
FIG. 9 is a lens cross sectional view illustrating Numerical Embodiment 5 of the present invention when the projection distance is infinite.
Figure 10A:
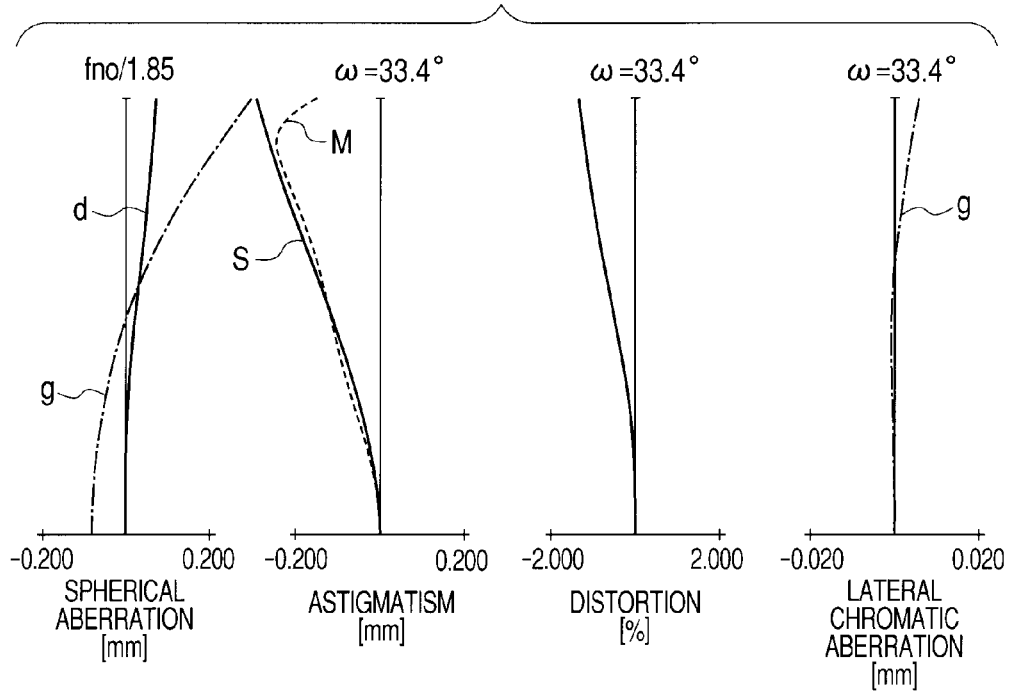
FIGS. 10A, 10B, and 10O are longitudinal aberration charts in Numerical Embodiment 5 of the present invention when the projection distance is 1.35 m.
Figure 10B:
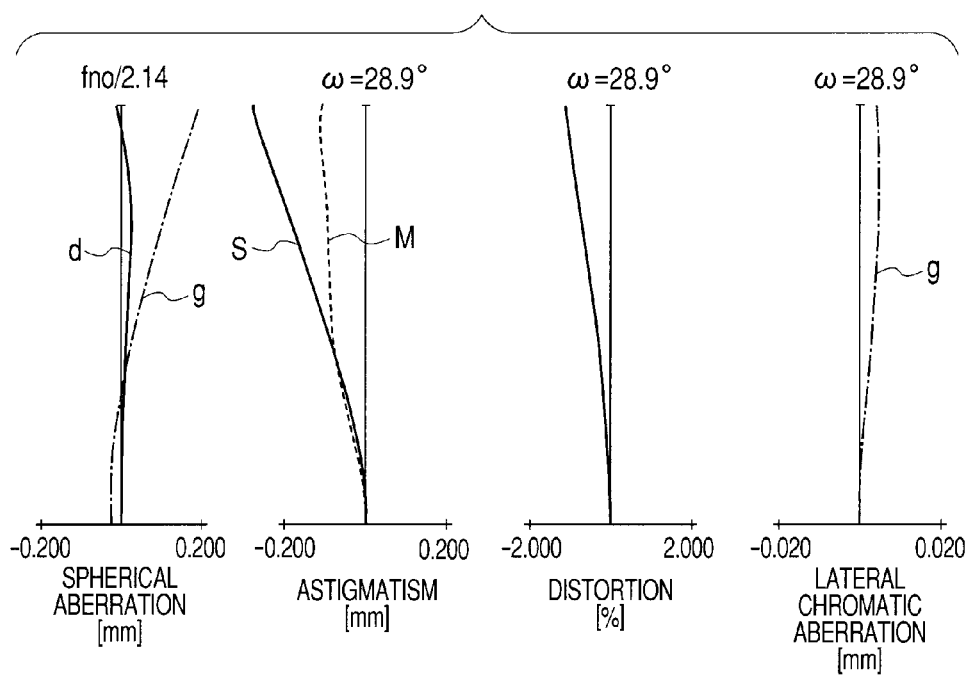
Figure 10C:
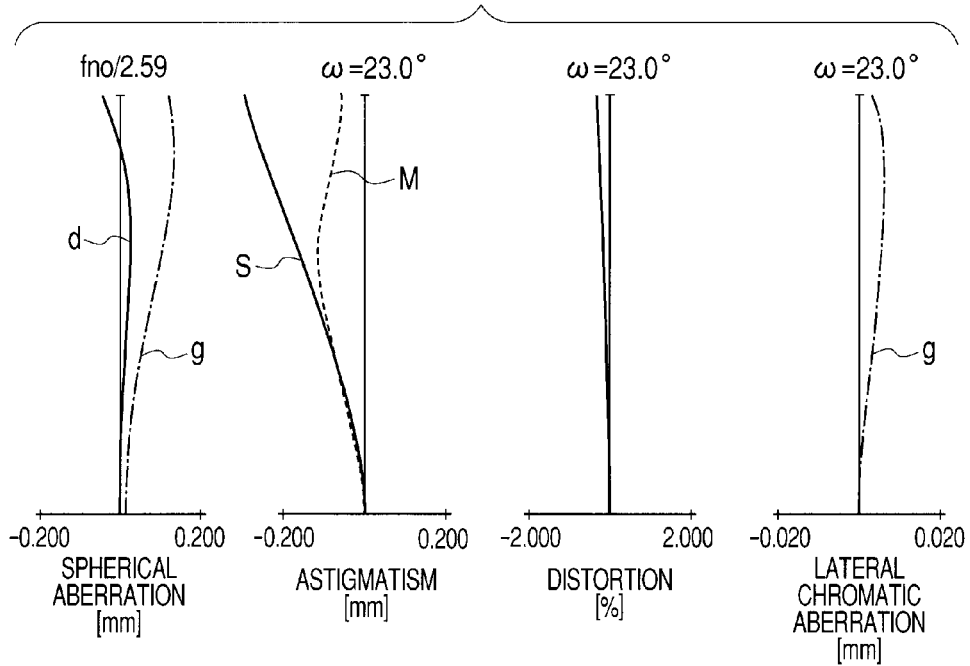

Embodiment 5 describes a zoom lens of which a half field angle at the wide angle end is 33.4°, a half field angle at the telephoto end is 23.0°, and a zoom ratio is 1.55. FIG. 9 is a lens cross sectional view illustrating an imaging optical system according to Embodiment 5 of the present invention at the wide angle end. FIGS. 10A, 10B, and 10O are respective longitudinal aberration charts at the wide angle end, an intermediate zoom position, and the telephoto end in a case where the object distance of the imaging optical system according to Embodiment 5 is 1.35 m.

The imaging optical system according to Embodiment 5 includes, in order from the magnifying conjugate side, first to sixth lens units L1 to L6. The first to sixth lens units L1 to L6 have a negative refractive power, a positive refractive power, a positive refractive power, a negative refractive power, a positive refractive power, and a positive refractive power, respectively. The first lens unit L1 is moved to the magnifying conjugate side during focusing from the infinite distance to the short distance. During zooming from the wide angle end to the telephoto end, the first lens unit L1 and the sixth lens unit L6 are not moved. During zooming from the wide angle end to the telephoto end, the second, third, fourth, and fifth lens units L2, L3, L4, and L5 are moved to the magnifying conjugate side to vary magnification or to correct an image plane variation due to magnification. In this embodiment, the second, third, fourth, and fifth lens units L2, L3, L4, and L5 are moved independently from one another during zooming.

The third lens unit L3 includes the aperture stop SP. A positive lens A($N_d$=1.77071, $v_d$=23.0, and $\theta_{gF}$=0.645) provided in the reduction conjugate side of the aperture stop SP satisfies Conditional Expressions (7) to (9).

Glass blocks GB correspond to a color combining prism, a polarizing filter, a color filter or the like.

[Embodiment 6]

Figure 11:
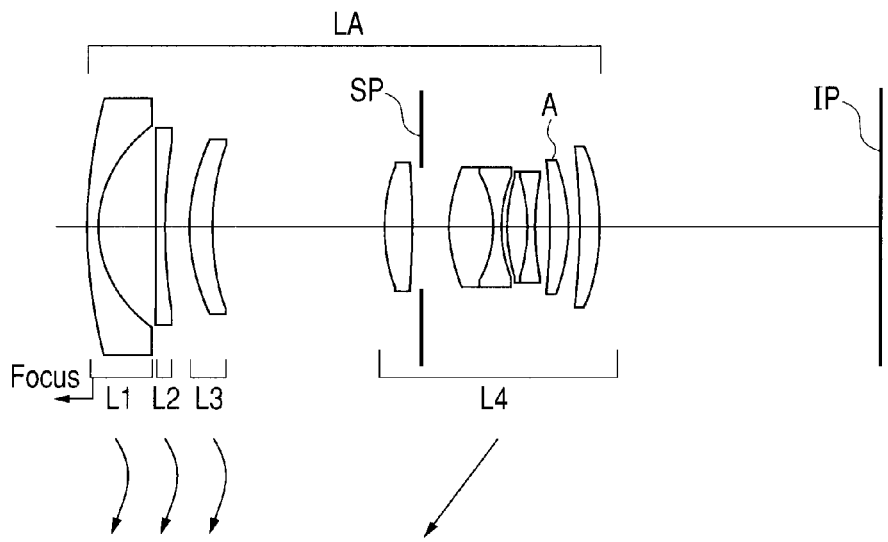
FIG. 11 is a lens cross sectional view illustrating Numerical Embodiment 6 of the present invention when the object distance is infinite.
Figure 12A:
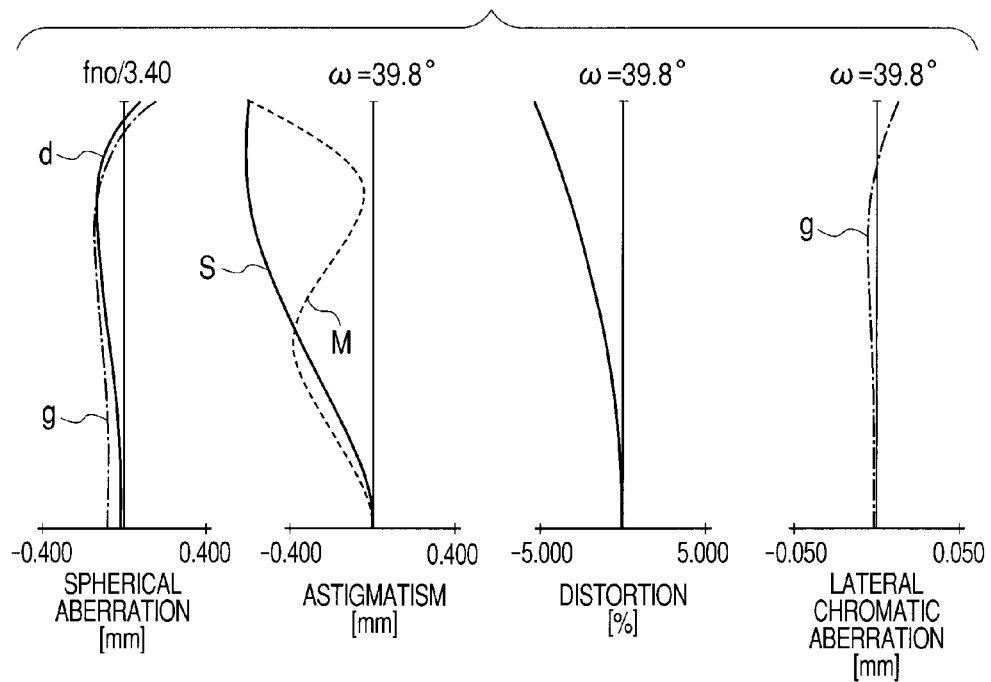
FIGS. 12A, 12B, and 12C are longitudinal aberration charts in Numerical Embodiment 6 of the present invention when the object distance is 1.2 m.
Figure 12B:
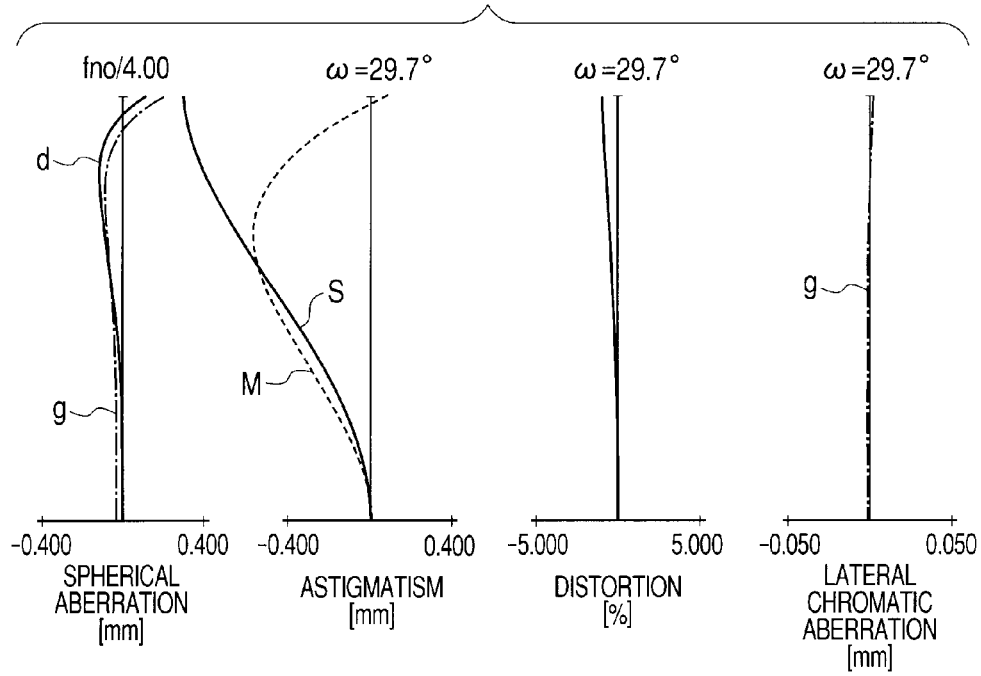
Figure 12C:
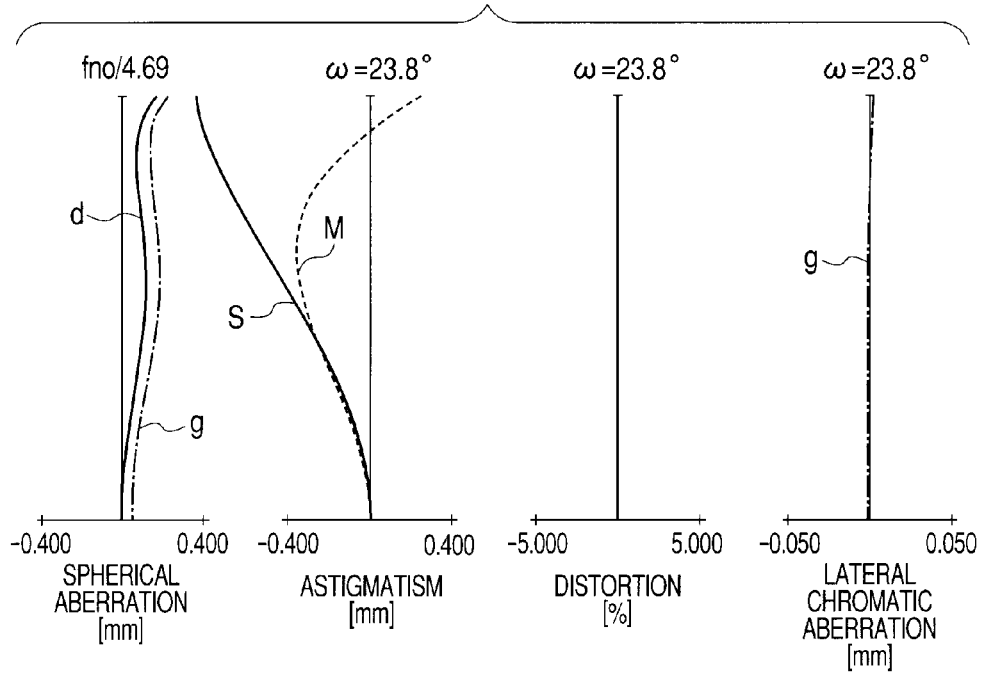

Embodiment 6 describes a zoom lens of which a half field angle at the wide angle end is 39.8°, a half field angle at the telephoto end is 23.8°, and a zoom ratio is 1.88. FIG. 11 is a lens cross sectional view illustrating an imaging optical system according to Embodiment 6 of the present invention at the wide angle end. FIGS. 12A, 12B, and 12C are respective longitudinal aberration charts at the wide angle end, an intermediate zoom position, and the telephoto end in a case where the object distance of the imaging optical system according to Embodiment 6 is 1.2 m.

The imaging optical system according to Embodiment 6 includes, in order from the magnifying conjugate side, a first lens unit L1 having a negative refractive power, a second lens unit L2 having a negative refractive power, a third lens unit L3 having a positive refractive power, and a fourth lens unit L4 having a positive refractive power. During focusing from the infinite distance to the short distance, the first lens unit L1 is moved to the magnifying conjugate side. During zooming from the wide angle end to the telephoto end, the first lens unit L1, the second lens unit L2, the third lens unit L3, and the fourth lens unit L4 are moved. In this embodiment, the first, the second, the third, and the fourth lens units L1, L2, L3, and L4 are moved independently from one another during zooming.

In the imaging optical system according to this embodiment, the fourth lens unit L4 includes the aperture stop SP. A positive lens A($N_d$=1.77071, $\nu_d$=23.0, and $\theta_{gF}$=0.668) provided in the reduction conjugate side of the aperture stop SP satisfies Conditional Expressions (7) to (9).

[Embodiment 7]

Figure 13:
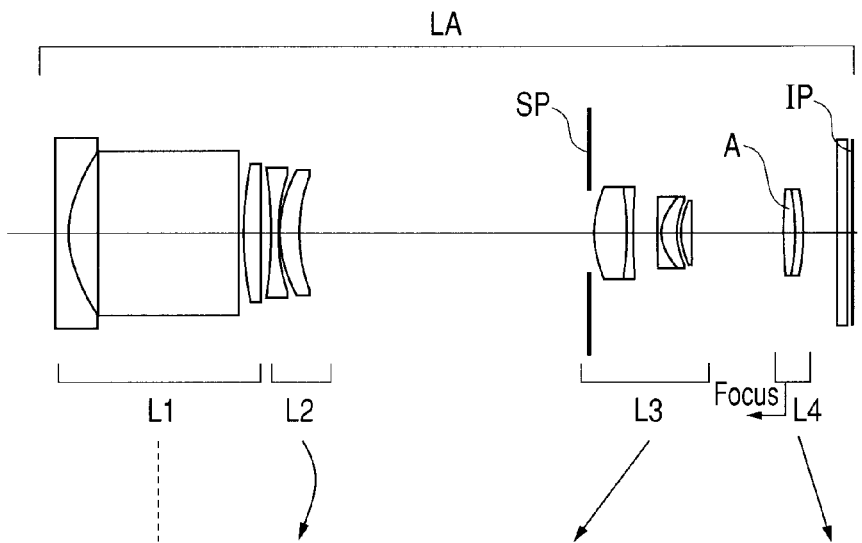
FIG. 13 is a lens cross sectional view illustrating Numerical Embodiment 7 of the present invention when the object distance is infinite.
Figure 14A:
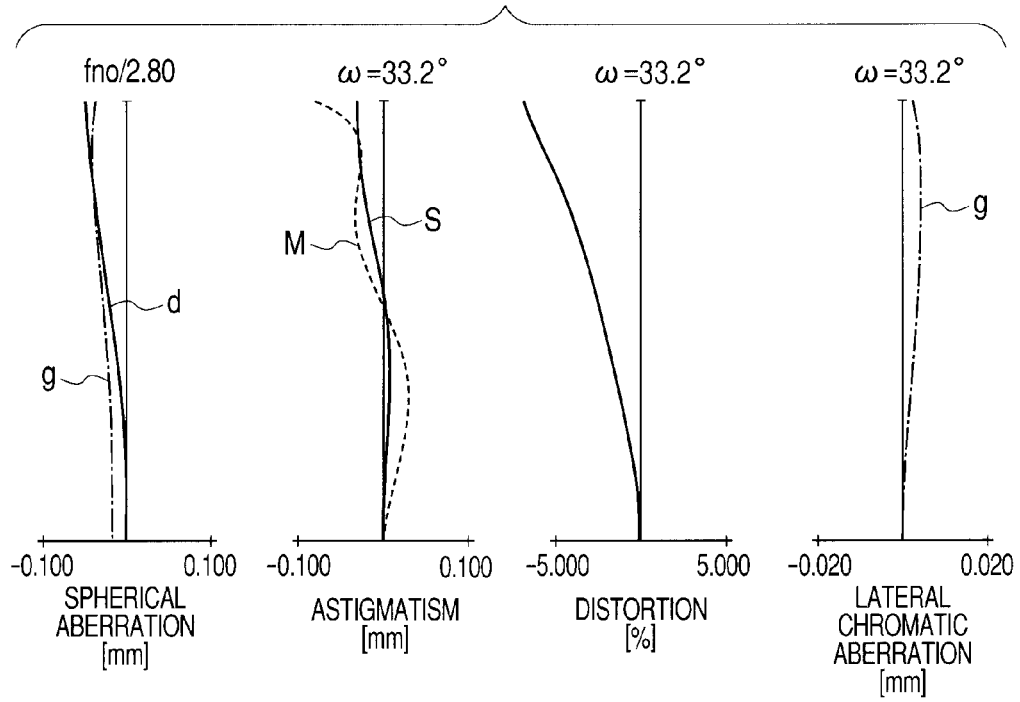
FIGS. 14A, 14B, and 14C are longitudinal aberration charts in Numerical Embodiment 7 of the present invention when the object distance is infinite.
Figure 14B:
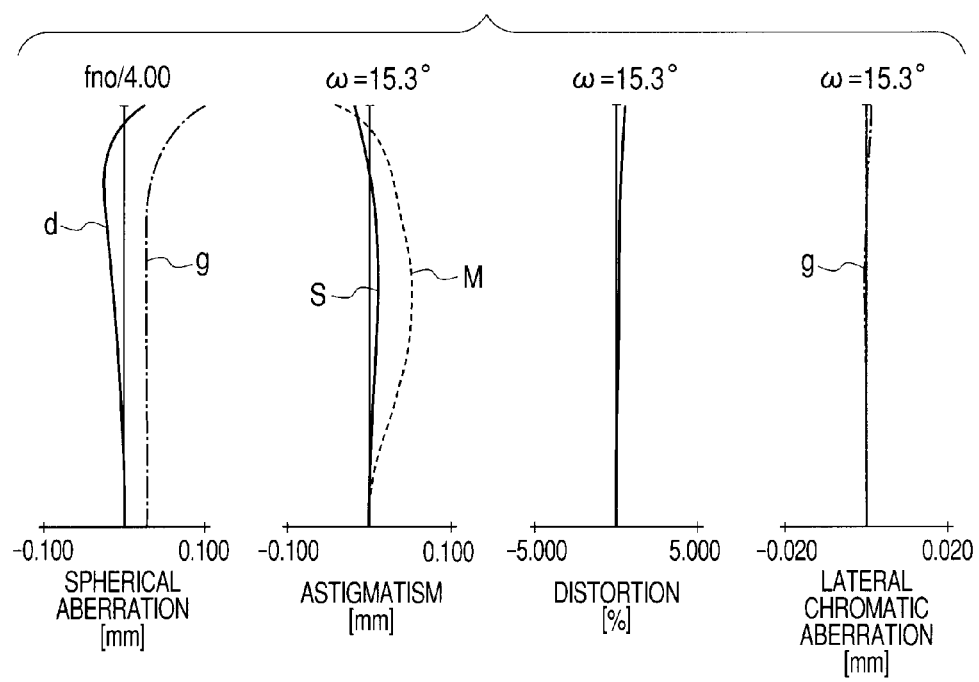
Figure 14C:
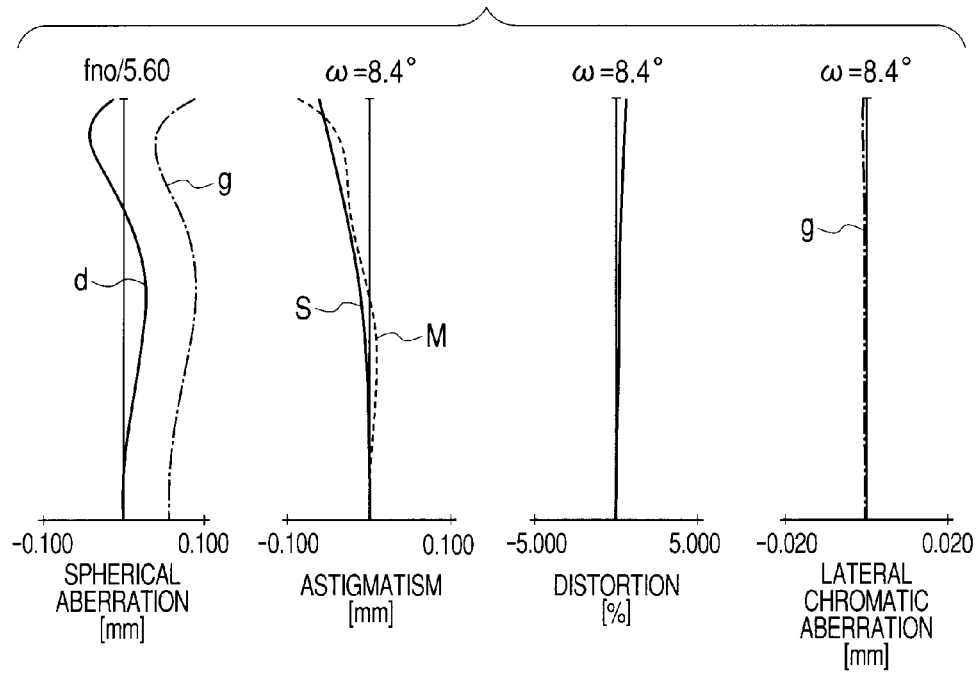

Embodiment 7 describes a zoom lens of which a half field angle at the wide angle end is 33.6°, a half field angle at the telephoto end is 8.40°, and a zoom ratio is 4.48. FIG. 13 is a lens cross sectional view illustrating an imaging optical system according to Embodiment 7 of the present invention at the wide angle end. FIGS. 14A, 14B, and 14C are respective longitudinal aberration charts at the wide angle end, an intermediate zoom position, and the telephoto end in a case where the object distance of the imaging optical system according to Embodiment 7 is an infinite distance.

The imaging optical system according to Embodiment 7 includes, in order from the magnifying conjugate side, a first lens unit L1 having a negative refractive power, a second lens unit L2 having a negative refractive power, a third lens unit L3 having a positive refractive power, and a fourth lens unit L4 having a positive refractive power. The fourth lens unit L4 is moved to the magnifying conjugate side during focusing from the infinite distance to the short distance. During zooming from the wide angle end to the telephoto end, the second, third, and fourth lens units L2, L3, and L4 are moved. In this embodiment, the second, third, and fourth lens units L2, L3, and L4 are moved independently from one another during zooming.

The third lens unit L3 includes the aperture stop SP. A positive lens A($N_d$=1.77071, $\nu_d$=23.0, and $\theta_{gF}$=0.645) provided in the reduction conjugate side of the aperture stop SP satisfies Conditional Expressions (7) to (9).

Hereinafter, Numerical Embodiments 1 to 7 corresponding to Embodiments 1 to 7 of the present invention are described. In the respective numerical embodiments, a focal length (mm), an F number, and a field angle (degrees) of the entire system in a case where the system is focused on the infinite-distance object are represented by f, fno, and 2ω, respectively. Also, r(mm) indicates a lens thickness or an air interval between optical surfaces, nd indicates a refractive index with respect to d-line, $\nu_d$ indicates an Abbe number with respect to d-line, and variable interval is in millimeters (mm).

Assume that an optical axis direction is an X-axis, a direction perpendicular to the optical axis is an H axis, and a light traveling direction is positive. In this case, when R denotes a paraxial curvature radius, k denotes an eccentricity, and A, B, C, D, and E denote aspherical coefficients, an aspherical surface shape is expressed by the following expression.

$$X = \frac{\left(\frac{H^2}{R}\right)}{\left\{1+\sqrt{1-(1+K)\cdot\left(\frac{H}{R}\right)^2}\right\}} + A\cdot H^2 + B\cdot H^4 + C\cdot H^6 + D\cdot H^8 + E\cdot H^{10}$$

A relationship between the respective conditional expressions described above and various numerical values in the numerical embodiments is illustrated in Table 1.

(Numerical Embodiment 1)

| | f = 25.00 Fno = 1.46 2ω = 81.8° | | | | | |
|---|---|---|---|---|---|---|
| Surface number | r | d | nd | vd | Effective diameter | |
| 1 | 106.476 | 2.80 | 1.69680 | 55.5 | 52.62 | |
| 2 | 34.237 | 7.20 | | | 43.99 | |
| 3 | 231.200 | 2.30 | 1.69680 | 55.5 | 43.78 | |
| 4 | 36.544 | 5.48 | | | 39.80 | |
| 5 | 152.788 | 5.38 | 1.79952 | 42.2 | 39.73 | |
| 6 | −73.268 | 2.87 | | | 39.50 | |
| 7 | 52.697 | 3.50 | 1.84666 | 23.8 | 32.57 | |
| 8 | 125.863 | 1.70 | 1.43875 | 95.0 | 31.14 | |
| 9 | 25.660 | 7.10 | | | 26.95 | |
| 10 | ∞ | 7.48 | | | 24.90 | |
| 11 | 55.654 | 7.30 | 1.80400 | 46.6 | 28.32 | |
| 12 | −44.368 | 2.00 | | | 28.20 | |
| 13 | −160.594 | 1.48 | 1.75520 | 27.5 | 25.63 | θgF = 0.635 |
| 14 | 83.004 | 3.13 | | | 24.75 | |
| 15 | ∞ | 8.68 | | | 24.10 | Stop |
| 16 | −17.472 | 1.50 | 1.84666 | 23.8 | 22.79 | |
| 17 | 42.214 | 6.75 | 1.60300 | 65.4 | 27.56 | |
| 18* | −26.911 | 0.15 | | | 28.33 | |
| 19* | −160.623 | 6.00 | 1.43875 | 95.0 | 30.48 | |

-continued f = 25.00 Fno = 1.46 2ω = 81.8°

| | | | | | |
|---|---|---|---|---|---|
| 20 | −24.626 | 0.15 | | | 31.32 |
| 21 | −273.831 | 7.25 | 1.73000 | 26.0 | 36.05 |
| 22 | −30.409 | | | | 37.09 |

Aspherical data

Eighteenth surface

K = 0.00000e+000   A = 0           B = 1.29928e−005   C = 9.54236e−009
D = −1.36553e−010  E = 3.48384e−013

Nineteenth surface

K = 0.00000e+000   A = 0           B = 3.56049e−007   C = −3.33936e−008
D = 7.24902e−011   E = −3.40933e−014

(Numerical Embodiment 2)

f = 18.55~21.99~28.98 Fno = 1.85~2.12~2.60 2ω = 66.7°~58.0°~45.7°

| Surface number | r | d | nd | vd | Effective diameter | |
|---|---|---|---|---|---|---|
| 1 | 37.239 | 2.20 | 1.69680 | 55.5 | 43.87 | |
| 2 | 23.002 | 6.56 | | | 37.42 | |
| 3 | 48.303 | 1.75 | 1.69680 | 55.5 | 36.98 | |
| 4 | 28.497 | 7.26 | | | 34.14 | |
| 5 | −261.631 | 1.80 | 1.65844 | 50.9 | 33.83 | |
| 6 | 81.947 | 2.32 | | | 33.30 | |
| 7* | 1439.991 | 3.60 | 1.52996 | 55.8 | 33.39 | |
| 8* | 486.971 | (Variable) | | | 33.22 | |
| 9 | 239.472 | 5.95 | 1.54814 | 45.8 | 30.54 | |
| 10 | −45.702 | 0.00 | | | 30.25 | |
| 11 | ∞ | 0.16 | | | 28.73 | Flare cut |
| 12 | 78.411 | 3.37 | 1.67270 | 32.1 | 27.90 | |
| 13 | −608.645 | 2.21 | | | 26.93 | |
| 14 | −57.473 | 2.20 | 1.65844 | 50.9 | 26.14 | |
| 15 | −138.642 | (Variable) | | | 25.55 | |
| 16 | ∞ | 0.44 | | | 22.17 | Stop |
| 17 | 69.302 | 2.57 | 1.56384 | 60.7 | 22.18 | |
| 18 | −80.870 | (Variable) | | | 22.08 | |
| 19 | 35.058 | 1.00 | 1.72342 | 38.0 | 19.91 | |
| 20 | 22.105 | (Variable) | | | 19.04 | |
| 21 | −21.344 | 1.35 | 1.84666 | 23.8 | 18.65 | |
| 22 | 42.312 | 5.55 | 1.49700 | 81.5 | 20.21 | |
| 23 | −26.437 | 0.15 | | | 21.37 | |
| 24 | 114.268 | 4.00 | 1.77071 | 23.0 | 24.64 | θgF = 0.668 |
| 25 | −41.575 | 1.00 | 1.83400 | 37.2 | 25.24 | |
| 26 | 3021.028 | 0.46 | | | 26.56 | |
| 27 | 1189.872 | 6.47 | 1.49700 | 81.5 | 27.01 | |
| 28 | −26.116 | (Variable) | | | 28.24 | |
| 29 | 64.844 | 3.50 | 1.83400 | 37.2 | 35.08 | |
| 30 | −881.733 | 2.52 | | | 34.95 | |
| 31 | ∞ | 30.00 | 1.51633 | 64.1 | 34.16 | |
| 32 | ∞ | 21.00 | 1.69680 | 55.5 | 28.37 | |
| 33 | ∞ | | | | 24.75 | |

Aspherical data

Seventh surface

K = 4.92437e+003   A = 0           B = 2.00194e−005   C = −4.37081e−008
D = 8.87604e−011   E = −1.81134e−013

Eighth surface

K = 0.00000e+000   A = 0           B = 1.23110e−005   C = −3.65955e−008
E = −6.55099e−014  F = −7.73723e−017

| | Focal length | | |
|---|---|---|---|
| Variable interval | 18.55 | 21.99 | 28.98 |
| d8 | 32.02 | 23.41 | 12.51 |
| d15 | 33.58 | 30.24 | 21.77 |
| d18 | 2.17 | 6.61 | 16.09 |

-continued

| f = 18.55~21.99~28.98 Fno = 1.85~2.12~2.60 2ω = 66.7°~58.0°~45.7° | | | |
|---|---|---|---|
| d20 | 6.19 | 7.90 | 6.93 |
| d28 | 8.94 | 14.81 | 25.67 |

(Numerical Embodiment 3)

| f = 48.85~62.70~77.00 Fno = 2.50~2.85~3.20 2ω = 55.86°~44.88°~37.18° | | | | | |
|---|---|---|---|---|---|
| Surface number | r | d | nd | vd | Effective diameter |
| 1 | 145.968 | 9.40 | 1.80440 | 39.6 | 81.35 |
| 2 | −1917.291 | 0.25 | | | 78.66 |
| 3 | 66.996 | 4.00 | 1.48749 | 70.2 | 61.78 |
| 4 | 33.183 | 15.04 | | | 49.38 |
| 5 | −101.584 | 2.50 | 1.48749 | 70.2 | 47.68 |
| 6 | 36.013 | 6.32 | | | 40.60 |
| 7 | 50.072 | 4.50 | 1.60562 | 43.7 | 39.45 |
| 8 | 129.707 | (Variable) | | | 38.52 |
| 9* | 83.077 | 4.40 | 1.64000 | 60.1 | 29.73 |
| 10 | −128.042 | 7.00 | | | 29.69 |
| 11 | ∞ | (Variable) | | | 28.32 Stop |
| 12 | −253.928 | 7.30 | 1.77250 | 49.6 | 26.71 |
| 13 | −34.913 | 2.20 | 1.74077 | 27.8 | 26.54 |
| 14 | −104.388 | (Variable) | | | 27.52 |
| 15 | 94.595 | 5.45 | 1.83400 | 37.2 | 28.77 |
| 16 | −138.906 | 1.69 | | | 29.12 |
| 17* | −64.950 | 1.80 | 1.62004 | 36.3 | 29.12 |
| 18 | 53.965 | (Variable) | | | 30.10 |
| 19 | −57.656 | 3.00 | 1.84666 | 23.8 | 34.60 |
| 20 | 102.653 | 11.30 | 1.48749 | 70.2 | 39.74 |
| 21 | −62.527 | 0.25 | | | 45.01 |
| 22 | −2569.051 | 6.10 | 1.78800 | 47.4 | 49.98 |
| 23 | −97.611 | 0.25 | | | 51.60 |
| 24 | 99.183 | 10.40 | 1.77071 | 23.0 | 56.50 θgF = 0.668 |
| 25 | −212.253 | 5.00 | | | 56.78 |
| 26 | ∞ | 46.25 | 1.51633 | 64.1 | 56.11 |
| 27 | ∞ | | | | 53.18 |

Aspherical data

Ninth surface

K = −6.03718e−001  A = 0  B = 2.23798e−007  C = −1.13330e−009
D = 3.04999e−012

Seventeenth surface

K = 1.93656e−003  A = 0  B = 1.30289e−007  C = −1.61419e−009
D = 5.48305e−012

| | Focal length | | |
|---|---|---|---|
| Variable interval | 48.85 | 62.70 | 77.00 |
| d8 | 38.51 | 21.05 | 7.80 |
| d11 | 9.62 | 12.27 | 12.56 |
| d14 | 0.76 | 7.11 | 18.60 |
| d18 | 10.90 | 19.35 | 20.83 |

(Numerical Embodiment 4)

| f = 25.33~38.00~48.94 Fno = 3.33~3.99~4.68 2ω = 81.00°~59.31°~47.70° | | | | | |
|---|---|---|---|---|---|
| Surface number | r | d | nd | vd | Effective diameter |
| 1 | 56.834 | 1.71 | 1.67790 | 55.3 | 32.66 |
| 2* | 13.901 | 7.75 | | | 25.12 |
| 3 | −193.910 | 1.44 | 1.49700 | 81.5 | 24.73 |
| 4 | 270.130 | 3.14 | | | 24.00 |
| 5 | 25.360 | 2.02 | 1.80518 | 25.4 | 21.49 |
| 6 | 35.590 | (Variable) | | | 20.72 |

-continued f = 25.33~38.00~48.94 Fno = 3.33~3.99~4.68 2ω = 81.00°~59.31°~47.70°

| | | | | | | |
|---|---|---|---|---|---|---|
| 7 | 28.635 | 3.33 | 1.60300 | 65.4 | 16.34 | |
| 8 | −115.304 | 1.80 | | | 16.24 | |
| 9 | ∞ | 3.00 | | | 15.87 | Stop |
| 10 | 22.783 | 5.93 | 1.72342 | 38.0 | 15.12 | |
| 11 | −15.437 | 1.10 | 1.80440 | 39.6 | 13.95 | |
| 12 | 18.193 | 0.77 | | | 12.70 | |
| 13 | 25.657 | 2.66 | 1.56384 | 60.7 | 12.72 | |
| 14 | −23.393 | 0.99 | 1.84666 | 23.8 | 12.59 | |
| 15* | 37.011 | 2.24 | | | 13.65 | |
| 16 | −116.115 | 2.04 | 1.77071 | 23.0 | 15.53 | θgF = 0.668 |
| 17 | −29.139 | 2.01 | | | 16.38 | |
| 18 | −83.544 | 2.80 | 1.48749 | 70.2 | 18.78 | |
| 19 | −26.938 | | | | 19.74 | |

Aspherical data

Second surface

K = −7.74650e−001  A = 0  B = 2.09451e−005  C = 1.23678e−008
D = 2.76193e−010

Fifteenth surface

K = −5.17403e+000  A = 0  B = 2.07003e−005  C = −1.16063e−007
D = 6.03801e−010

| | Focal length | | |
|---|---|---|---|
| Variable interval | 25.33 | 38.00 | 48.94 |
| d6 | 22.78 | 7.49 | 0.65 |

(Numerical Embodiment 5)

f = 18.48~22.08~28.72 Fno = 1.85~2.14~2.59 2ω = 66.86°~57.84°~46.03°

| Surface number | r | d | nd | vd | Effective diameter | |
|---|---|---|---|---|---|---|
| 1 | 37.239 | 2.20 | 1.69680 | 55.5 | 43.86 | |
| 2 | 23.002 | 6.56 | | | 37.40 | |
| 3 | 48.303 | 1.75 | 1.69680 | 55.5 | 36.95 | |
| 4 | 28.497 | 7.26 | | | 34.11 | |
| 5 | −261.631 | 1.80 | 1.65844 | 50.9 | 33.79 | |
| 6 | 81.947 | 2.32 | | | 33.25 | |
| 7* | 1439.991 | 3.60 | 1.52996 | 55.8 | 33.33 | |
| 8* | 486.971 | (Variable) | | | 33.15 | |
| 9 | 333.596 | 5.95 | 1.54814 | 45.8 | 30.29 | |
| 10 | −44.132 | 0.00 | | | 30.03 | |
| 11 | ∞ | 0.16 | | | 28.48 | Flare cut |
| 12 | 76.624 | 3.37 | 1.67270 | 32.1 | 27.65 | |
| 13 | −480.607 | 2.21 | | | 26.70 | |
| 14 | −56.252 | 2.20 | 1.65844 | 50.9 | 25.87 | |
| 15 | −147.599 | (Variable) | | | 25.62 | |
| 16 | ∞ | 0.44 | | | 22.38 | Stop |
| 17 | 70.805 | 2.57 | 1.56384 | 60.7 | 22.26 | |
| 18 | −74.898 | (Variable) | | | 22.10 | |
| 19 | 35.978 | 1.00 | 1.72342 | 38.0 | 19.99 | |
| 20 | 22.021 | (Variable) | | | 19.10 | |
| 21 | −20.977 | 1.35 | 1.84666 | 23.8 | 18.79 | |
| 23 | 40.494 | 5.21 | 1.49700 | 81.5 | 20.48 | |
| 24 | −25.615 | 0.15 | | | 21.37 | |
| 25 | 108.832 | 3.95 | 1.77071 | 23.0 | 24.10 | θgF = 0.645 |
| 26 | −35.285 | 1.00 | 1.83400 | 37.2 | 24.58 | |
| 27 | −2464.726 | 0.58 | | | 26.01 | |
| 28 | 539.494 | 6.43 | 1.49700 | 81.5 | 26.68 | |
| 29 | −25.906 | (Variable) | | | 27.86 | |
| 30 | 69.790 | 3.50 | 1.83400 | 37.2 | 34.04 | |
| 31 | −749.699 | 2.52 | | | 33.89 | |
| 32 | ∞ | 30.00 | 1.51633 | 64.1 | 33.17 | |
| 33 | ∞ | 21.00 | 1.69680 | 55.5 | 27.96 | |
| 34 | ∞ | | | | 24.71 | |

-continued f = 18.48~22.08~28.72 Fno = 1.85~2.14~2.59 2ω = 66.86°~57.84°~46.03°

Aspherical data

Seventh surface

K = 4.92437e+003   A = 0                  B = 2.00194e−005   C = −4.37081e−008
D = 8.87604e−011   E = 10 = −1.81134e−013

Eighth surface

K = 0.00000e+000   A = 0                  B = 1.23110e−005   C = −3.65955e−008
D = 3.61352e−011   E = −6.55099e−014      F = −7.73723e−017

| | Focal length | | |
|---|---|---|---|
| Variable interval | 18.48 | 22.08 | 28.72 |
| d8 | 32.51 | 23.27 | 12.54 |
| d15 | 33.50 | 30.53 | 23.27 |
| d18 | 2.36 | 6.74 | 15.47 |
| d20 | 5.93 | 7.53 | 6.73 |
| d29 | 8.98 | 15.21 | 25.26 |

(Numerical Embodiment 6)

f = 26.00~38.00~49.00 Fno = 3.40~4.00~4.69 2ω = 79.53°~59.31°~47.65°

| Surface number | r | d | nd | νd | Effective diameter | |
|---|---|---|---|---|---|---|
| 1 | 73.076 | 1.71 | 1.67790 | 55.3 | 33.05 | |
| 2* | 15.692 | (Variable) | | | 26.21 | |
| 3 | 292.757 | 1.44 | 1.49700 | 81.5 | 25.37 | |
| 4 | 79.391 | (Variable) | | | 24.53 | |
| 5 | 27.747 | 3.21 | 1.80518 | 25.4 | 22.55 | |
| 6 | 38.472 | (Variable) | | | 21.11 | |
| 7 | 27.578 | 3.91 | 1.60300 | 65.4 | 15.92 | |
| 8 | −136.604 | 1.80 | | | 15.73 | |
| 9 | ∞ | 3.00 | | | 15.38 | Stop |
| 10 | 22.526 | 5.98 | 1.72342 | 38.0 | 14.65 | |
| 11 | −14.755 | 1.10 | 1.80440 | 39.6 | 13.44 | |
| 12 | 16.902 | 0.75 | | | 12.23 | |
| 13 | 23.509 | 2.90 | 1.56384 | 60.7 | 12.58 | |
| 14 | −22.244 | 0.99 | 1.84666 | 23.8 | 13.02 | |
| 15* | 42.923 | 2.24 | | | 14.16 | |
| 16 | −85.538 | 2.50 | 1.77071 | 23.0 | 15.91 | θgF = 0.668 |
| 17 | −26.906 | 1.50 | | | 17.07 | |
| 18 | −75.154 | 2.54 | 1.48749 | 70.2 | 19.05 | |
| 19 | −27.909 | | | | 19.90 | |

Aspherical data

Second surface

K = −7.94601e−001   A = 0   B = 1.16488e−005   C = 3.23331e−008
D = 7.35835e−011

Fifteenth surface

K = −5.94583e+000   A = 0   B = 1.76388e−005   C = −1.53351e−007
D = 5.88307e−010

| | Focal length | | |
|---|---|---|---|
| Variable interval | 26.00 | 38.00 | 49.00 |
| d2 | 7.50 | 7.02 | 6.82 |
| d4 | 3.14 | 4.03 | 4.07 |
| d6 | 22.78 | 7.55 | 0.67 |

(Numerical Embodiment 7)

| f = 5.45~13.02~24.22 Fno = 2.80~4.00~5.60 2ω = 66.45°~30.67°~16.77° | | | | | | |
|---|---|---|---|---|---|---|
| Surface number | r | d | nd | vd | Effective diameter | |
| 1 | −878.603 | 1.45 | 1.77250 | 49.6 | 20.54 | |
| 2* | 12.326 | 3.32 | | | 17.48 | |
| 3 | ∞ | 16.00 | 1.83400 | 37.2 | 17.39 | |
| 4 | ∞ | 0.40 | | | 14.99 | |
| 5 | 44.900 | 2.01 | 1.84666 | 23.8 | 14.71 | |
| 6 | 1088.182 | (Variable) | | | 14.28 | |
| 7* | −53.810 | 0.68 | 1.49700 | 81.5 | 13.97 | |
| 8 | 22.270 | 0.34 | | | 13.50 | |
| 9 | 14.863 | 2.10 | 1.84666 | 23.8 | 13.51 | |
| 10 | 20.295 | (Variable) | | | 12.83 | |
| 11 | ∞ | 0.50 | | | 8.98 | Stop |
| 12* | 11.113 | 3.90 | 1.77250 | 49.6 | 9.39 | |
| 13 | −22.537 | 0.50 | 1.61293 | 37.0 | 8.78 | |
| 14 | 37.864 | 2.78 | | | 8.41 | |
| 15 | 100.000 | 0.50 | 1.72151 | 29.2 | 7.44 | |
| 16 | 5.000 | 1.70 | 1.76200 | 40.1 | 6.98 | |
| 17* | 9.447 | 0.50 | | | 6.72 | |
| 18 | 9.613 | 1.00 | 1.48749 | 70.2 | 6.80 | |
| 19 | 56.662 | (Variable) | | | 6.73 | |
| 20* | 32.558 | 1.50 | 1.77071 | 23.0 | 9.00 | θgF = 0.645 |
| 21 | −23.688 | 0.90 | 1.77250 | 49.6 | 8.96 | |
| 22 | −23.670 | (Variable) | | | 8.93 | |
| 23 | ∞ | 1.28 | 1.51633 | 64.1 | 20.00 | |
| 24 | ∞ | | | | 20.00 | |

Aspherical data

Second surface

K = 0.00000e+000   A = 0   B = −4.76782e−005   C = −1.33978e−006
D = 1.87321e−008   E = −1.43601e−010

Seventh surface

K = 0.00000e+000   A = 0   B = −4.04618e−005   C = −3.22721e−007
D = 9.56895e−009   E = −1.77075e−010

Twelfth surface

K = 0.00000e+000   A = 0   B = −1.25054e−005   C = −2.08374e−007
D = −5.06991e−009   E = −3.83585e−011

Seventeenth surface

K = 0.00000e+000   A = 0   B = 3.09708e−004   C = 4.27334e−006
D = 1.39680e−008   E = 2.88779e−009

Twentieth surface

K = 0.00000e+000   A = 0   B = −1.55949e−004   C = 9.47994e−006
D = −5.56983e−007   E = 1.14305e−008

| | Focal length | | |
|---|---|---|---|
| Variable interval | 5.45 | 13.02 | 24.22 |
| d6 | 1.16 | 14.00 | 3.00 |
| d10 | 32.98 | 5.39 | 1.64 |
| d19 | 10.65 | 26.36 | 42.08 |
| d22 | 4.00 | 3.04 | 2.08 |

TABLE 1

| | Embodiment 1 | Embodiment 2 | Embodiment 3 | Embodiment 4 | Embodiment 5 | Embodiment 6 | Embodiment 7 |
|---|---|---|---|---|---|---|---|
| Conditional Expression (1) | 0.804 | — | — | — | — | — | — |
| Conditional Expression (2) | 26 | — | — | — | — | — | — |
| Conditional Expression (3) | 1.85 | — | — | — | — | — | — |
| Conditional Expression (4) | 13.73 | — | — | — | — | — | — |
| Conditional Expression (5) | 1.73000 | — | — | — | — | — | — |

TABLE 1-continued

| | Embodiment 1 | Embodiment 2 | Embodiment 3 | Embodiment 4 | Embodiment 5 | Embodiment 6 | Embodiment 7 |
|---|---|---|---|---|---|---|---|
| Conditional Expression (6) | 94.99 | — | — | — | — | — | — |
| Conditional Expression (7) | — | 0.825 | 0.825 | 0.825 | 0.802 | 0.825 | 0.802 |
| Conditional Expression (8) | — | 23 | 23 | 23 | 23 | 23 | 23 |
| Conditional Expression (9) | — | 1.72 | 1.45 | 1.42 | 1.52 | 1.40 | 1.57 |
| Conditional Expression (10) | — | 17.01 | 16.76 | 11.35 | 16.68 | 11.45 | 18.60 |
| Conditional Expression (11) | — | 1.77071 | 1.77071 | 1.77071 | 1.77071 | 1.77071 | 1.77071 |
| Conditional Expression (12) | — | 81.54 | 70.23 | 70.23 | 81.54 | 70.23 | 70.23 |

Figure 15:
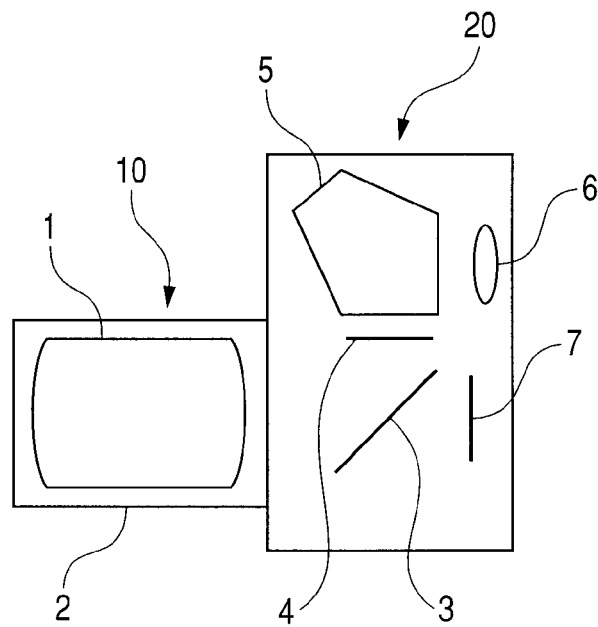
FIG. 15 is an explanatory view illustrating an image pickup apparatus according to the present invention.

Next, an example is described in which the imaging optical system according to the present invention is applied to an image pickup apparatus (camera system). FIG. 15 is a principal schematic view illustrating an example in which the imaging optical system according to the present invention is applied to an image pickup optical system of a single-lens reflex camera. In FIG. 15, an image pickup lens 10 includes an image pickup optical system 1 according to any one of Embodiments 1 to 7 and a lens barrel 2 for supporting the image pickup optical system 1. A camera main body 20 includes a quick return mirror 3 for reflecting a light beam from the image pickup lens 10 upwardly, a focusing plate 4 provided in an image formation position of the image pickup lens 10, and a penta roof prism 5 for converting a reverse image formed on the focusing plate 4 into an erected image. The camera main body 20 further includes an eyepiece 6 for observing the erected image obtained by conversion and a photosensitive plane 7. A solid-state image pickup element (photoelectric transducer) such as a CCD sensor or a CMOS sensor, or a silver-halide film is provided at the photosensitive plane 7. When image pickup is to be performed using the image pickup apparatus (in the case of image pickup), the quick return mirror 3 is removed from an optical path and an image is formed on the photosensitive plane 7 by the image pickup lens 10.

Next, an example in which the imaging optical system according to the present invention is applied to a projection optical system of an image projection apparatus is described with reference to FIG. 16.

Figure 16:
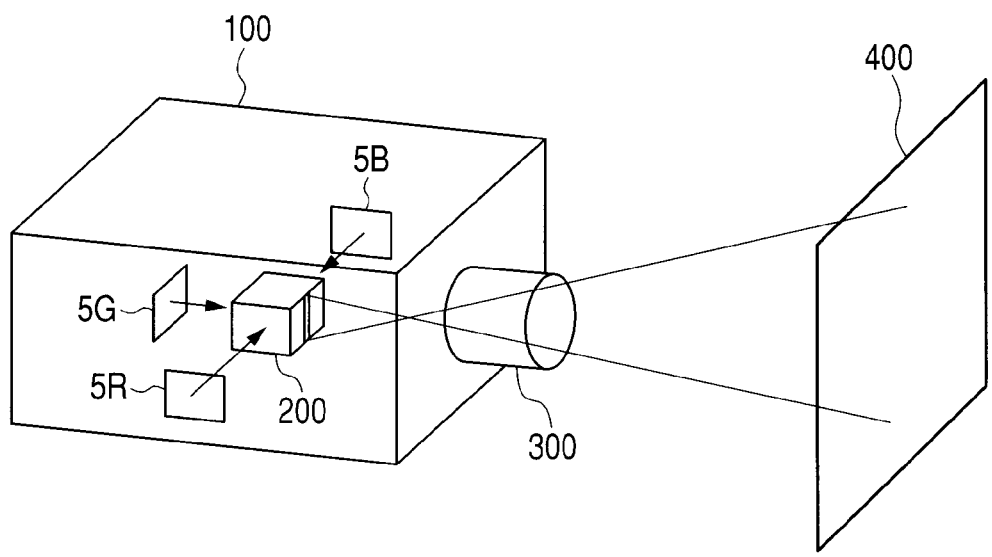
FIG. 16 is an explanatory view illustrating a projection apparatus according to the present invention.

FIG. 16 illustrates a three-plate type color liquid crystal projector using the imaging optical system according to the present invention, which is an image projection apparatus in which image information of multiple color beams based on multiple liquid crystal display elements are combined by a color combining unit and enlargingly projected onto a screen by a projection lens. In a color liquid crystal projector 100 illustrated in FIG. 16, respective color beams of R, G, and B from three panels 5R, 5G, and 5B for R (red light), G (green light), and B (blue light) are combined by a prism 200 serving as the color combining unit, to thereby form a single optical path. In FIG. 16, the single prism 200 is illustrated as the color combining unit. However, the present invention is not limited to such a prism. Multiple prisms (dichroic prism or polarization beam splitter) may be used. A combined color beam (beam having color image information) obtained by the color combining unit is projected to a screen 400 by a projection lens 300 including one of the imaging optical systems described above.

Figure 17:
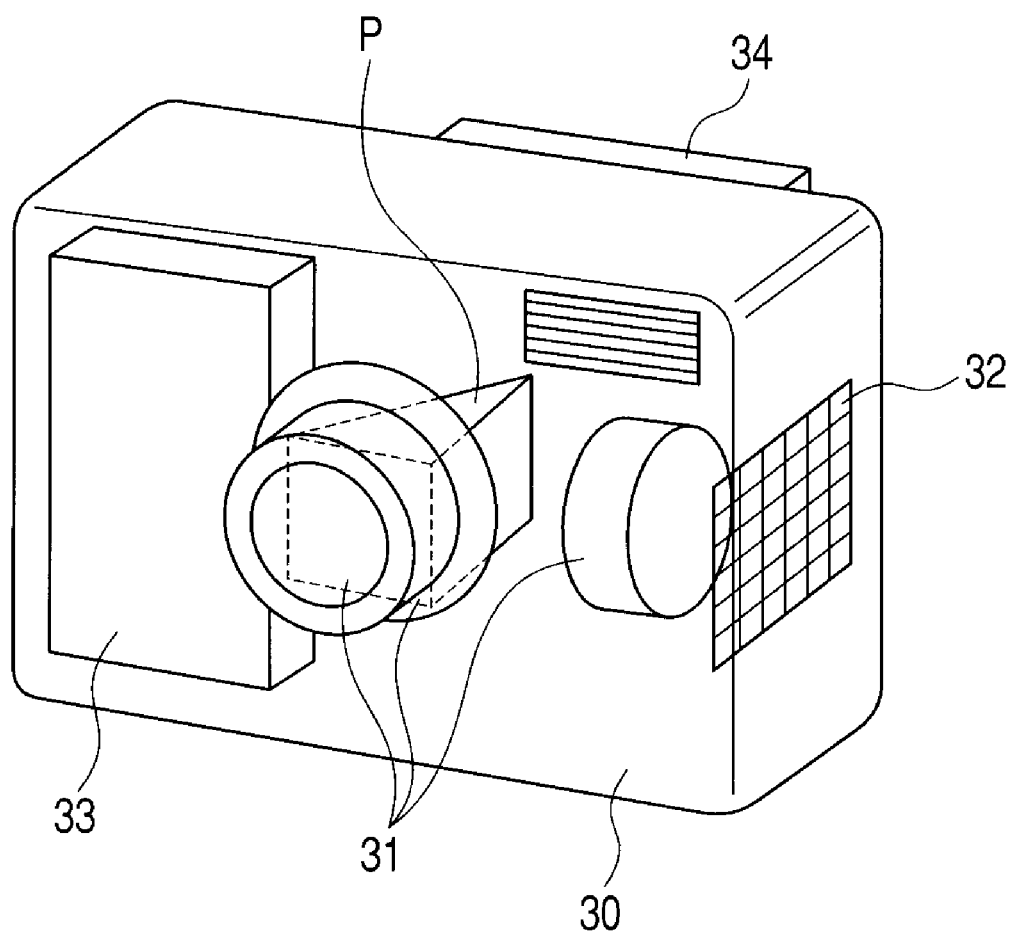
FIG. 17 is an explanatory view illustrating the image pickup apparatus according to the present invention.

Next, an example of a digital still camera using the optical system according to the present invention (particularly zoom lens as described in Embodiment 7) as the image pickup optical system is described with reference to FIG. 17. In FIG. 17, the digital still camera includes a camera main body 30, an image pickup optical system 31, a solid-state image pickup element 32 such as a CCD sensor or a CMOS sensor, a memory 33, and a finder 34. The solid-state image pickup element 32 is contained in the camera main body 30 and receives light from a subject image formed by the image pickup optical system 31. The memory 33 stores information corresponding to the subject image obtained by photoelectric conversion by the solid-state image pickup element 32. The finder 34 includes a liquid crystal display panel and is used to observe the subject image formed on the solid-state image pickup element 32.

As described above, when the imaging optical system according to any one of Embodiments 1 to 7 is applied to the single-lens reflex camera, the digital camera, or the projector, an optical apparatus having high optical performance may be realized.

The exemplary embodiments of the present invention are described, but the present invention is not limited to the embodiments and various modifications and changes may be made without departing from the scope of the present invention. For example, in Embodiments 1 to 7, a lens unit such as a converter lens or an afocal lens may be provided on at least one of the object side of the first lens unit L1 and the image side of the lens unit located closest to the image side.

According to each of the embodiments of the present invention as described above, an imaging optical system in which chromatic aberrations are corrected across the entire screen to realize high optical performance, an image projection apparatus in which chromatic aberrations may be corrected across the entire screen to project a high-quality image, and an image pickup apparatus capable of picking up a high-quality subject image may be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-333870, filed Dec. 26, 2008, which is hereby incorporated by reference herein in its entirety.

What is claimed is:

1. An optical system comprising, in order from a magnifying-conjugate side, a first lens unit having a negative refractive power, and a rear group having one of a positive refractive power and a negative refractive power and including at least one lens unit, wherein each interval between lens units including the first lens unit and the at least one lens unit of the rear group is changed during zooming, the optical system further comprising:
an aperture stop; and
a first positive lens provided in the reduction-conjugate side of the aperture stop,
wherein the first lens unit is provided in the most magnifying-conjugate side,
wherein the following conditions are satisfied:

$$0.802 \leq \theta_{gFz} - (1.000 \times 10^{-4} \times V_{dz}^2 - 9.10 \times 10^{-3} \times v_{dz}) < 0.86,$$

$$10 < v_{dz} < 30, \text{ and}$$

$$0.5 < f_{Gz}|\sqrt{f_W \times f_T} < 1.9$$

where $f_{Gz}$ indicates a focal length of the first positive lens, $f_W$ indicates a focal length of the entire optical system at a wide angle end, $f_T$ indicates a focal length of the entire optical system at a telephoto end, $N_{gz}$, $N_{Fz}$, $N_{dz}$, and $N_{Cz}$ indicate refractive indices of the first positive lens with respect to a g-line, an F-line, a d-line, and a C-line, respectively, and $\theta_{gFz}$ and $v_{dz}$ indicate a partial dispersion ratio and an Abbe number of the first positive lens, respectively, and
where $v_{dz}$ and $\theta_{gFz}$ are expressed as follows:

$$v_{dz} = (N_{dz}-1)/(N_{Fz}-N_{Cz}),$$

$$\theta_{gFz} = (N_{gz}-N_{Fz})/(N_{Fz}-N_{Cz}), \text{ and}$$

wherein the optical system includes a first negative lens which has a minimum Abbe number with respect to the d-line among negative lenses located in the reduction-conjugate side of the aperture stop; and
the first negative lens satisfies the following condition:

$$0 < \left| \frac{v_{Nzmin} \times f_{Nz}}{\sqrt{f_W \times f_T}} \right| < 25$$

where $v_{Nzmin}$ indicates the Abbe number of the first negative lens and $f_{Nz}$ indicates a focal length of the first negative lens.

2. An optical system according to claim 1, wherein the first positive lens satisfies $1.7 < N_{dz} < 2.2$.

3. An optical system according to claim 1, wherein the optical system includes a second positive lens which has a maximum Abbe number with respect to the d-line among positive lenses located in the reduction-conjugate side of the aperture stop except the first positive lens; and the second positive lens satisfies the following condition:

$$65 < v_{pzmax} < 98$$

where $v_{pzmax}$ indicates the Abbe number of the second positive lens.

4. An optical apparatus including an optical system, the optical system comprising, in order from a magnifying-conjugate side, a first lens unit having a negative refractive power, and a rear group having one of a positive refractive power and a negative refractive power and including at least one lens unit, wherein each interval between lens units including the first lens unit and the at least one lens unit of the rear group is changed during zooming, the optical system further comprising:
an aperture stop; and
a first positive lens provided in the reduction-conjugate side of the aperture stop,
wherein the first lens unit is provided in the most magnifying-conjugate side,
wherein the following conditions are satisfied:

$$0.802 \leq \theta_{gFz} - (1.000 \times 10^{-4} \times V_{dz}^2 - 9.10 \times 10^{-3} \times v_{dz}) < 0.86,$$

$$10 < v_{dz} < 30, \text{ and}$$

$$0.5 < f_{Gz}|\sqrt{f_W \times f_T} < 1.9$$

where $f_{Gz}$ indicates a focal length of the first positive lens, $f_W$ indicates a focal length of the entire optical system at a wide angle end, $f_T$ indicates a focal length of the entire optical system at a telephoto end, $N_{gz}$, $N_{Fz}$, $N_{dz}$, and $N_{Cz}$ indicate refractive indices of the first positive lens with respect to a g-line, an F-line, a d-line, and a C-line, respectively, and $\theta_{gFz}$ and $V_{dz}$ indicate a partial dispersion ratio and an Abbe number of the first positive lens, respectively, and
where $v_{dz}$ and $\theta_{gFz}$ are expressed as follows:

$$v_{dz} = (N_{dz}-1)/(N_{Fz}-N_{Cz}),$$

$$\theta_{gFz} = (N_{gz}-N_{Fz})/(N_{Fz}-N_{Cz}), \text{ and}$$

wherein the optical system includes a first negative lens which has a minimum Abbe number with respect to the d-line among negative lenses located in the reduction-conjugate side of the aperture stop; and
the first negative lens satisfies the following condition:

$$0 < \left| \frac{v_{Nzmin} \times f_{Nz}}{\sqrt{f_W \times f_T}} \right| < 25$$

where $v_{Nzmin}$ indicates the Abbe number of the first negative lens and $f_{Nz}$ indicates a focal length of the first negative lens.

* * * * *